(12) United States Patent
Okumura et al.

(10) Patent No.: US 6,924,856 B2
(45) Date of Patent: Aug. 2, 2005

(54) LIQUID-CRYSTAL DISPLAY DEVICE AND METHOD OF FABRICATING THE SAME

(75) Inventors: Hiroshi Okumura, Tokyo (JP); Masayoshi Suzuki, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 0 days.

(21) Appl. No.: 10/172,261

(22) Filed: Jun. 14, 2002

(65) Prior Publication Data

US 2002/0191128 A1 Dec. 19, 2002

(30) Foreign Application Priority Data

Jun. 14, 2001 (JP) ........................................ 2001-180622

(51) Int. Cl.[7] ...................... G02F 1/1335; G02F 1/1343
(52) U.S. Cl. ........................... 349/96; 349/95; 349/112; 349/119; 349/143; 349/146; 349/155; 349/178
(58) Field of Search ............................. 349/57, 61, 64, 349/86, 95, 112, 117, 119, 143, 146, 155, 156, 177, 178

(56) References Cited

U.S. PATENT DOCUMENTS

| | | | | |
|---|---|---|---|---|
| 4,836,652 A | * | 6/1989 | Oishi et al. | .................. 349/95 |
| 5,229,873 A | | 7/1993 | Hirose et al. | ................. 359/55 |
| 5,309,264 A | | 5/1994 | Lien et al. | ..................... 359/87 |
| 5,319,478 A | | 6/1994 | Funfschilling et al. | ........ 359/53 |
| 5,946,067 A | * | 8/1999 | Kim et al. | .................. 349/141 |
| 5,963,290 A | | 10/1999 | Murai et al. | ................ 349/191 |
| 6,055,103 A | * | 4/2000 | Woodgate et al. | .......... 359/494 |
| 6,657,689 B2 | * | 12/2003 | Baek | .......................... 349/114 |

FOREIGN PATENT DOCUMENTS

| | | | |
|---|---|---|---|
| EP | 0 538 796 B1 | 3/1998 | ......... G02F/1/1335 |
| JP | 04-502524 | 5/1992 | ............ G02F/1/137 |
| JP | 04-261522 | 9/1992 | ............ G02F/1/137 |
| JP | 4-369618 | 12/1992 | ......... G02F/1/1333 |
| JP | 05-113561 | 5/1993 | ......... G02F/1/1335 |
| JP | 06-043461 | 2/1994 | ......... G02F/1/1337 |
| JP | 10-048628 | 2/1998 | ......... G02F/1/1335 |
| JP | 10-142577 | 5/1998 | ............ G02F/1/133 |
| JP | 10-197844 | 7/1998 | ............ G02F/1/133 |
| JP | 10-020323 | 10/1998 | ......... G02F/1/1343 |
| JP | 10-333180 | 12/1998 | ............ G02F/1/136 |
| JP | 2000-171617 | 6/2000 | ............. G02B/5/02 |

* cited by examiner

*Primary Examiner*—Toan Ton
*Assistant Examiner*—Tai Duong
(74) *Attorney, Agent, or Firm*—Hayes & Soloway P.C.

(57) ABSTRACT

A LCD device is provided. On the input side, the collimated-light generator generates collimated light from incident light and then, the first polarizer plate of the first polarized-light controller generates first polarized light from the collimated light. The first quarter wavelength plate of the first polarized-light controller generates second polarized light from the first polarized light. The second polarized light thus generated passes through the liquid crystal layer to reach the output side. On the output side, the second polarized light passes through the second quarter wavelength plate of the second polarized-light controller and the second quarter wavelength plate thereof. Thus, the polarization state of the second polarized light is returned to its original one.

32 Claims, 28 Drawing Sheets

FIG. 4A
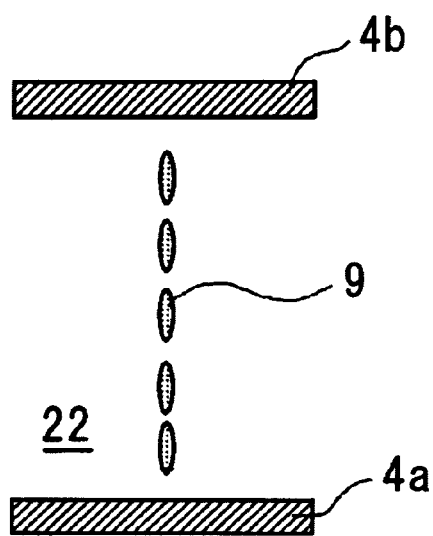
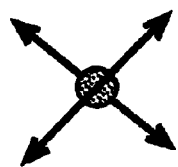
FIG. 4B
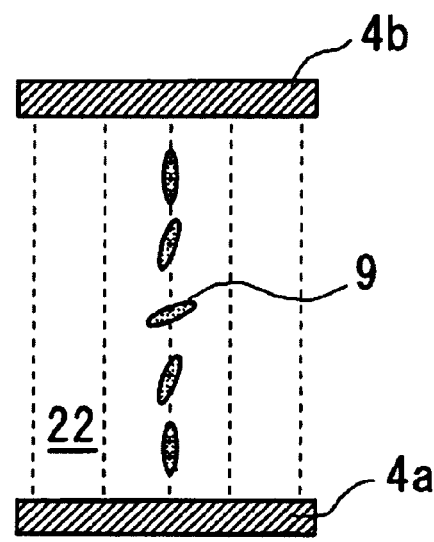
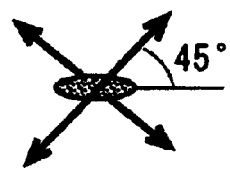

FIG. 4C
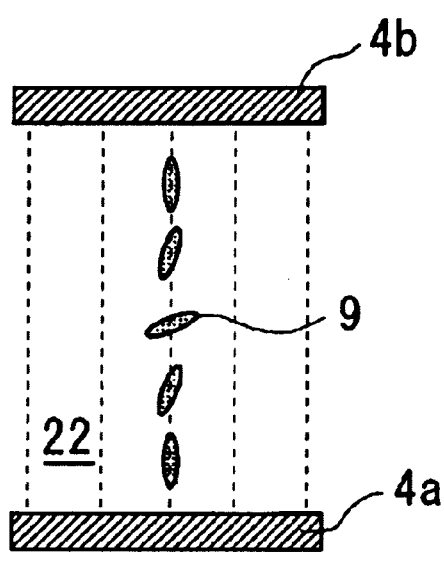
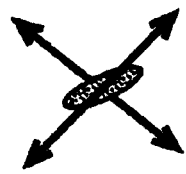
FIG. 4D
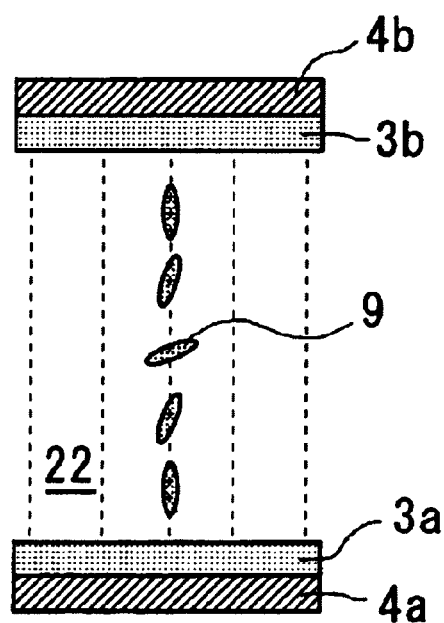
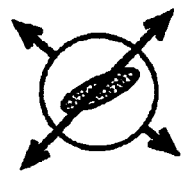

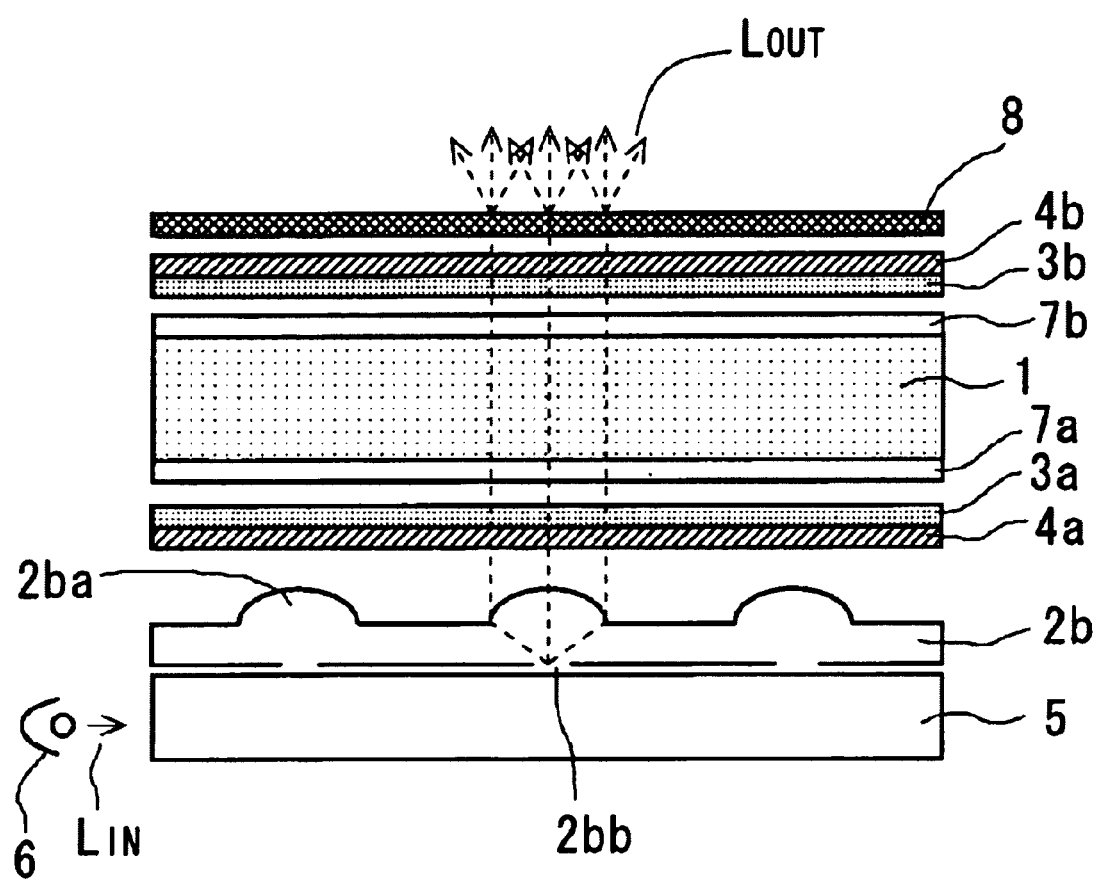

FIG. 6A
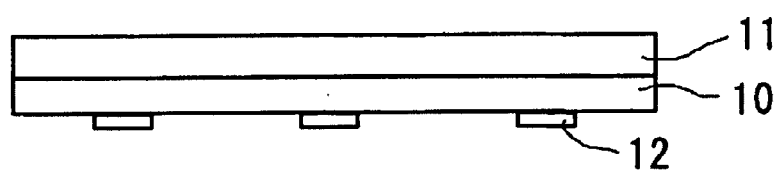
FIG. 6B
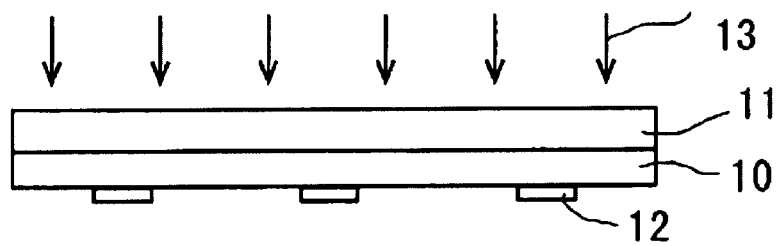
FIG. 6C
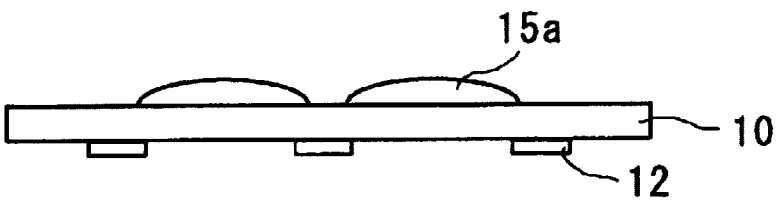

FIG. 11
(a)
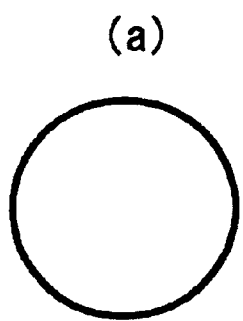
(b)
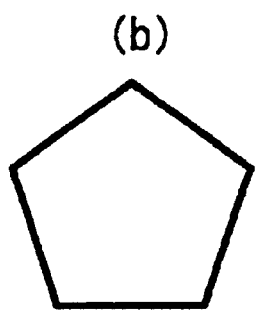
(c)
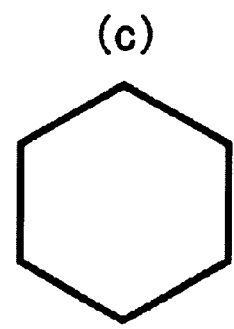
(d)
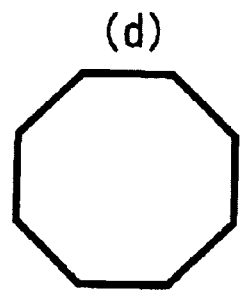
(e)
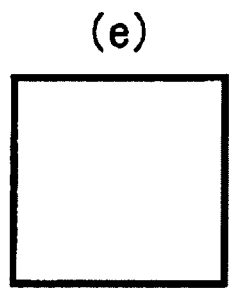

FIG. 13
(a)　　　　　(b)　　　　　(c)
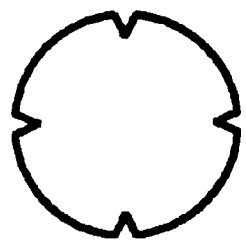 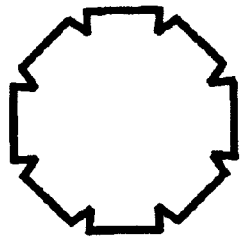 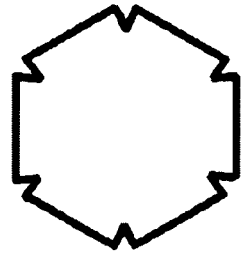
(d)　　　　　(e)
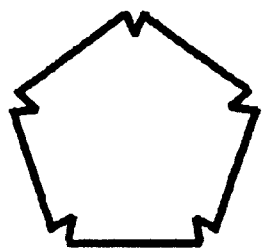 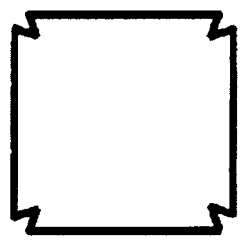

LIQUID-CRYSTAL DISPLAY DEVICE AND METHOD OF FABRICATING THE SAME

BACKGROUND OF THE INVENTION

1. Field of the Invention

The present invention relates generally to Liquid-Crystal Display (LCD) device. More particularly, the invention relates to a LCD device that makes it possible to achieve wide viewing angle and fast response, and a method of fabricating the device.

2. Description of the Related Art

Conventionally, LCD devices have been extensively used for electronic equipment designed for so-called Office Automation (OA) and portable communication and/or information-management terminals. This is because LCD devices have the advantage of compact, thin, and low power consumption.

With LCD devices, the alignment or orientation of liquid crystal molecules is changed by a voltage applied across the liquid crystal layer to thereby control the penetration of light utilizing a variety of the optical properties of the liquid crystal cell, such as the birefringence effect and rotary polarization. LCD devices are classified into various display types according to the utilization way or manner of the optical properties of the liquid crystal cell. In any type of LCD devices, existing important problems to be solved are to improve the viewing angle characteristics and to enhance the response characteristics that make it possible to cope with displaying moving pictures.

For example, with the LCD device of the Twisted Nematic (TN) type, which has been widely used so far, the orientation vector of liquid crystal molecules is changed from the "parallel" state or "white" displaying state where the molecules are parallel to the substrates toward the "black" displaying state according to the magnitude of a voltage applied. However, due to the peculiar actions to the liquid crystal molecules under application of the voltage, there is a problem that the obtainable viewing angle is narrow. This problem is observed remarkably in the rising direction of the molecules when displaying medium tones.

To solve this problem of the narrow viewing angle, various measure have been developed and proposed. For example, the Japanese Non-Examined Patent Publication Nos. 4-261522 published in 1992, 6-43461 published in 1994, and 10-333180 published in 1998 disclose the measures called the "dual domain" or "multiple domain" method. With these methods, a liquid crystal cell containing homeotropically aligned liquid crystal molecules is formed. This cell is sandwiched between two polarizer plates whose polarization axes are fixed to be perpendicular to each other. An oblique electric field is generated in each pixel by using a common electrode with opened portions. Thus, each pixel is formed by two or more liquid crystal domains, thereby improving the viewing angle characteristics. In particular, with the technique disclosed by the publication No. 4-261522, the alignment of the liquid crystal molecules under application of a voltage is controlled to realize high contrast.

Other examples of these measures are disclosed in the Japanese Non-Examined Patent Publication Nos. 6-43461 published in 1994 and 5-113561 published in 1993. These examples utilize optical components such as an optical compensator plate and a quarter wavelength plate to compensate the birefringence effect of liquid crystal, thereby improving the viewing angle characteristics and/or expanding the viewing angle. With the measure disclosed by the Publication No. 5-113561, quarter wavelength plates are used in addition to an optical compensator plate with a negative axis. These quarter wavelength plates are combined together in such a way that the first one of these plates has a positive optical anisotropy and the second one thereof has a negative one to cancel their own birefringence effects, thereby expanding the viewing angle.

Moreover, the Japanese Non-Examined Patent Publication No. 4-502524 published in 1993 discloses a LCD device of the In-Plane Switching (IPS) type. With this device, a voltage is applied across a pair of opposing electrodes provided on the same substrate to generate electric fields parallel to the substrates, thereby rotating the liquid crystal molecules while keeping the orientation of the molecules parallel to the substrates. Since there is no possibility that the molecules are oriented perpendicular to the substrates even when a voltage is applied, the birefringence change according to the change of the viewing angle is restrained within a narrow range. As a result, the viewing angle is increased.

The above-described prior-art techniques are to improve the viewing angle characteristics of LCD devices. Unlike this, the Japanese Non-Examined Patent Publication Nos. 10-142577 and 10-197844 both published in 1998 disclose LCD devices capable of switching between wide and narrow viewing angles.

With the device disclosed by the Publication No. 10-142577, two Thin-Film Transistors (TFTs) are provided for each pixel in the TN mode and at the same time, each pixel is divided into two regions where the liquid crystal molecules are rotated or inclined at different angles, thereby widening the viewing angle like the so-called "capacitance division" method. When the device is operated at the narrow viewing angle, one of the two TFTs is turned on to operate in the ordinary TN mode. When the device is operated at the wide viewing angle, both of the two TFTs are turned on to operate in the modified TN mode.

With the device disclosed by the Publication No. 10-197844, a Guest-Host (GH) element containing a dichroic pigment is stacked on the ordinary TN element. A voltage is applied across the GH element to control the viewing angle characteristics.

As explained above, the viewing angle characteristics of LCD devices are improved by using the above-described techniques. However, there are still many problems on improvement of fast response of LCD devices. In general, one of the known measures to improve the response speed of LCD devices is to increase the magnitude of a voltage applied across the liquid crystal molecules. In this case, however, if the cell gap is reduced, the capacitance of the liquid crystal increases. Thus, a problem is likely to occur. In particular, if the LCD panel is large-sized, a problem of signal transmission delay along the wiring lines and/or insufficient writing voltage to the TFTs will occur.

Another one of the known measures to improve the response speed of LCD devices is to increase the changeable range of transmittance of the liquid crystal molecule with respect to the inclination of the molecules by using a liquid crystal having a large birefringence or optical anisotropy $\Delta n$. In this case, however, there arises a problem that the viewing angle is narrowed due to the birefringence of liquid crystal. For example, with the nematic phase liquid crystal, the polarized state of the crystal varies according to the incidence angle of light thereto. As a result, there arises a problem that the light is transmitted even in the black displaying state or the contrast degrades. Furthermore, if the product (Δn·d) of the optical anisotropy Δn and the cell thickness d is increased, there arises a problem that the viewing angle is narrowed.

Not to degrade the viewing angle characteristics even if the anisotropy Δn is increased, measures to collimate the incident light with microlenses is disclosed by the Japanese Non-Examined Patent Publication Nos. 4-369618 published in 1996 and 2000-171617 published in 2000. The measure or technique disclosed by the Publication No. 2000-171617 is schematically shown in FIG. 1.

In FIG. 1, the prior-art LCD device of the Publication No. 2000-171617 comprises a liquid crystal section 101, polarizer plates 104a and 104b located respectively on the input and output sides of the section 101, microlens arrays 142a and 142b located on the input and output sides of the section 101, a guide plate 105 and a light source 106. The array 142a has microlenses 142aa arranged at specified intervals on the upper surface, and windows or openings 142ab located at the corresponding positions to the lenses 142aa on the lower flat surface. The array 142b has microlenses 142ba arranged at specified intervals on the lower surface. The upper surface of the array 142b is flat.

The incident light $L_{IN}$, which is introduced into the guide plate 105 through its side face, enters the microlens array 142a through the windows 142ab provided at its flat lower surface. The light $L_{IN}$ is collimated by the microlenses 142aa of the array 142a and then, converted to the linearly polarized light by the polarizer plate 104a and enters the liquid crystal section 101. The polarization direction of the light $L_{IN}$ is changed in the section 101. Thereafter, the light $L_{IN}$ thus direction-changed is selectively penetrated through the polarization plate 104b and collected by the microlenses 104ba of the array 104b, resulting in the output light $L_{OUT}$ emitted through the upper flat surface of the array 142b.

In this way, with the prior-art LCD device of FIG. 1, the liquid crystal section 101 is interposed between the microlens arrays 142a and 142b and therefore, the collimated light $L_{IN}$ is introduced into the section 101 even if the light $L_{IN}$ emitted from the source 106 is a diffused one. As a result, the problem that the contrast degrades dependent on the observation angle is suppressed.

However, even so, the linearly polarized light $L_{IN}$, which is generated by the polarizer plate 104a on the input side, enters the liquid crystal section 1 and then, the light $L_{IN}$ is turned on and off by the polarizer plate 104b on the output side. Thus, placement between the microlenses 142aa and 142ba, alignment between the polarizer plates 104a and 104b, and the orientation of the liquid crystal molecules require high accuracy. This causes a problem that the fabrication yield of the LCD panel degrades. Moreover, another problem that luminance decreases in part of the pixel occurs. This is due to the relationship between the driving direction of the liquid crystal molecules and the linearly polarized light.

Particularly, if the above-described technique is introduce collimated light into the liquid crystal section 101 is applied to the homeotropic orientation mode where high contrast is easily available, the transmitted light will not have a desired intensity, unless the orientation of rotation or inclination of the liquid crystal molecules is controlled accurately.

SUMMARY OF THE INVENTION

Accordingly, a chief object of the present invention is to provide a LCD device that improves the fast response characteristics, and a method of fabricating the device.

Another object of the present invention is to provide a LCD device that improves not only the viewing characteristics but also the fast response characteristics, and a method of fabricating the device.

Still another object of the present invention is to provide a LCD device that makes it possible to decrease effectively the necessary accuracy in placement and/or alignment of constituent elements or parts, and a method of fabricating the device.

A further object of the present invention is to provide a LCD device that is fabricated without lowering the fabrication yield, and a method of fabricating the device.

The above objects together with others not specifically mentioned will become clear to those skilled in the art from the following description.

According to a first aspect of the invention, a LCD device is provided, which comprises:

(a) a first substrate located on an input side;

(b) a second substrate fixed to be opposite to the first substrate;

the second substrate being located on an output side;

(c) a liquid crystal layer interposed between the first substrate and the second substrate;

the liquid crystal layer containing a liquid crystal;

the liquid crystal layer and the first and second substrates constituting a liquid crystal section;

(d) a collimator for collimating its incident light;

the collimator being located on the input side;

(e) a first polarization controller for controlling polarization state of its incident light;

the first polarization controller being located on the input side;

the first polarization controller including a first polarizer member and a first quarter wavelength member; and (g) a second polarization controller for controlling polarization state of its incident light;

the second polarization controller being located on the output side;

the second polarization controller including a second polarizer member and a second quarter wavelength member.

With the LCD device according to the first aspect of the invention, on the input side of the liquid crystal section, the collimator and the first polarization controller are provided. Thus, input light is collimated by the collimator and the polarization state of the input light is controlled by the first polarization controller. Thereafter, the incident light thus collimated and polarization-controlled is introduced into the liquid crystal section.

On the output side of the liquid crystal section, the second polarization controller is provided. Thus, the polarization state of the input light, which has passed through the liquid crystal section, is controlled by the second polarization controller.

Therefore, for example, the input light is converted to first circularly polarized input light by the first polarization controller to enter the liquid crystal section before or after collimation by the collimator. After the first circularly polarized input light passes through the section, it is converted to second circularly polarized input light by the second polarization controller.

Accordingly, the fast response characteristics of the LCD device can be improved, if a liquid crystal with a large optical anisotropy or birefringence Δn is used as the liquid crystal of the liquid crystal section.

Moreover, since the axis of the first polarizer member located on the input side and that of the second polarizer member located on the output side need not to be aligned accurately, the necessary accuracy in placement and/or alignment of constituent elements or parts can be effectively decreased. This means that desired redundancy is applicable to the fabrication processes. As a result, the device is fabricated without lowering the fabrication yield.

According to a second aspect of the invention, another LCD device is provided, which comprises:

(a) a first substrate located on an input side;
(b) a second substrate fixed to be opposite to the first substrate;
  the second substrate being located on an output side;
(c) a liquid crystal layer interposed between the first substrate and the second substrate;
  the liquid crystal layer containing a liquid crystal;
  the liquid crystal layer and the first and second substrates constituting a liquid crystal section;
(d) a collimator for collimating its incident light;
  the collimator being located on the input side;
(e) a first polarization controller for controlling polarization state of its incident light;
  the first polarization controller being located on the input side;
  the first polarization controller including a first polarizer member and a first quarter wavelength member;
(g) a second polarization controller for controlling polarization state of its incident light;
  the second polarization controller being located on the output side;
  the second polarization controller including a second polarizer member and a second quarter wavelength member; and
(h) a viewing-angle controller member located on the output side.

With the LCD device according to the second aspect of the invention, the viewing-angle controller member is additionally provided on the output side in the LCD device according to the first aspect. Therefore, the viewing angle is widened by the viewing-angle controller member. This means that not only the viewing characteristics but also the fast response characteristics are improved. Needless to say, the device of the second aspect has the same advantages as those of the device of the first aspect.

According to a third aspect of the invention, a method of fabricating a LCD device is provided, which is applicable to fabrication of the LCD devices of the first and second aspects. This method comprises the steps of:

(a) providing a first substrate whose surface is deformable by irradiation of laser light; and
(b) irradiating laser light having a specific intensity profile corresponding to respective pixels to the surface of the first substrate, thereby forming microlenses on the first substrate.

With the method of fabricating a LCD device according to the third aspect of the invention, a first substrate whose surface is deformable by irradiation of laser light is provided in the step (a) and then, laser light having a specific intensity profile corresponding to respective pixels is irradiated to the surface of the first substrate. Thus, concaves or convexes are formed on the surface of the first substrate according to the intensity profile. As a result, microlenses can be formed on the first substrate. This means that the LCD device of the first or second aspect is fabricated.

BRIEF DESCRIPTION OF THE DRAWINGS

In order that the present invention may be readily carried into effect, it will now be described with reference to the accompanying drawings.

FIGS. 4A to 4D are schematic views showing the operation principle of the device according to the first embodiment of FIG. 2 respectively, while comparing it with the prior-art device.

FIG. 5 is a schematic, partial cross-sectional view showing the structure of a LCD device according to the second embodiment of the invention.

FIGS. 6A to 6C are schematic, partial cross-sectional views showing a method of fabricating a LCD device according to the third embodiment of the invention, respectively, in which an array of convex microlens is formed on the substrate.

FIG. 11 is schematic partial plan views showing examples of the shape of the pixel electrode of the LCD device according to the invention.

FIG. 13 is schematic partial plan views showing examples of the shape of the pixel electrode of the LCD device according to the invention.

DETAILED DESCRIPTION OF THE INVENTION

Figure 1:
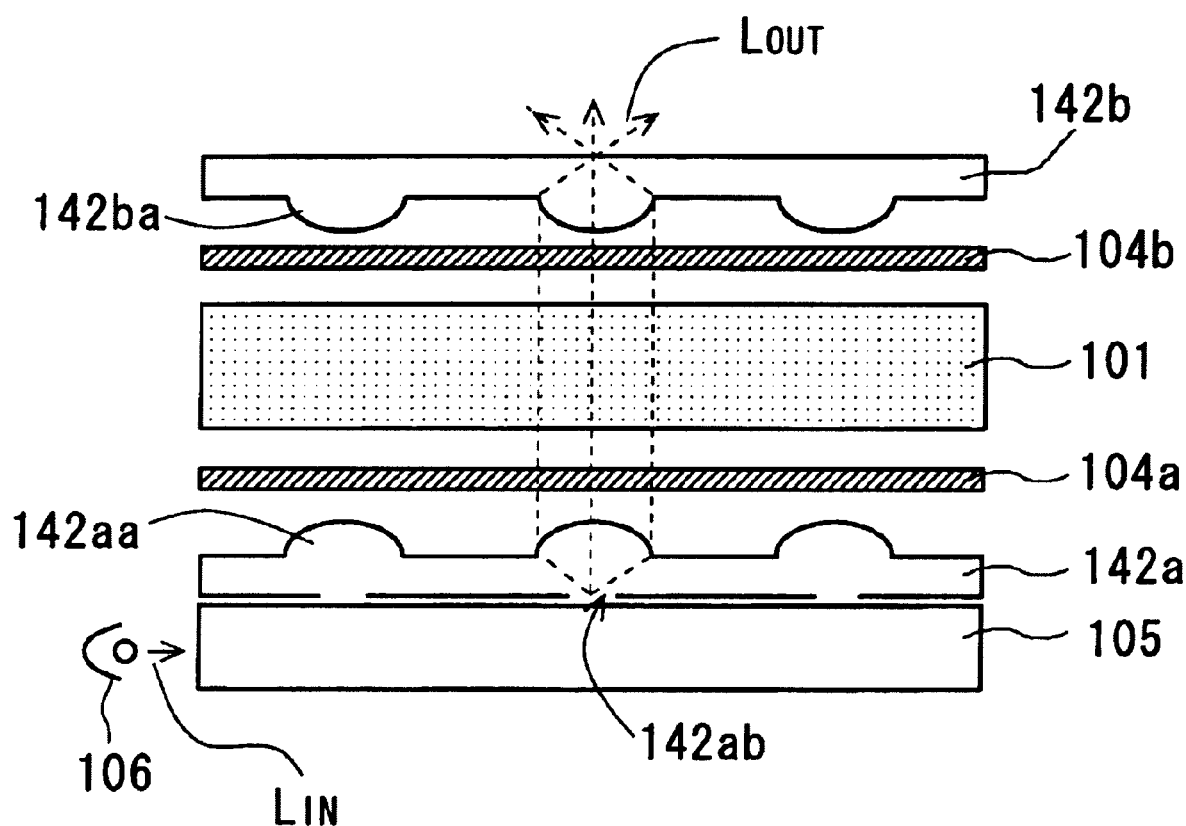
FIG. 1 is a schematic, partial cross-sectional view showing the structure of a prior-art LCD device with microlens arrays on the input and output sides.

Next, the present invention will be described in detail below.

The LCD devices according to the first and second aspects of the invention comprise the combinations of the constituent elements as described in SUMMARY OF THE INVENTION, respectively. However, they may be changed or modified in the following way.

The viewing-angle controller member is preferably formed detachable. In this case, the viewing angle is adjusted as desired by replacing the controller member with another one that generates a different viewing angle. Alternately, the controller member may contain a polymer-dispersed liquid crystal, in which the viewing angle is adjusted by changing the magnitude of transmittance of the crystal used by application of a voltage.

A half wavelength (λ/2) member may be additionally provided between the first polarizer member and the first substrate. Another half wavelength place may be additionally provided between the second polarizer member and the second substrate.

Preferably, the collimator is formed by a microlens array having microlenses arranged in a matrix array corresponding to respective pixels. It is preferred that the microlens array is made of a material (e.g., plate-shaped) deformable by irradiation of laser light, and that the material is united with a surface of the first substrate.

Preferably, the liquid crystal of the liquid crystal layer has a negative birefringence or optical anisotropy, in which the molecules of the liquid crystal are aligned approximately perpendicular to the first substrate when no voltage is applied. Alternately, the liquid crystal of the liquid crystal layer has a positive birefringence or optical anisotropy, in which the molecules of the liquid crystal are aligned approximately parallel to the first substrate to have the homogeneous alignment when no voltage is applied.

Scan signal electrodes or lines, data electrodes or data bus lines, and thin-film transistors (TFTs) are provided on the first substrate, where the TFTs are located in respective pixel regions defined by the scan signal electrodes or lines and the data electrodes or lines. A color filter is provided on the first substrate to implement color display in the respective pixels. Pixel electrodes are formed over the color filter by way of an overcoat layer. A common opposite or counter electrode is provided on the second substrate to be opposite to the pixel electrodes.

Preferably, each of the electrodes on the first substrate is formed to have a symmetrical shape. The electrode on the second substrate is formed to cover the entirety of the electrodes on the first substrate and to be wider than the electrodes on the first substrate.

Each of the electrodes on the first substrate may have the following structures. Specifically, each of the electrodes on the first substrate has a structure including a depression or recess formed entirely or partially at a symmetrical position. Each of the electrodes on the first substrate has a structure including a columnar spacer formed at a symmetrical position. The electrode on the second substrate has a structure including protrusions formed entirely or partially at positions overlapped with symmetrical axes of the electrodes on the first substrate when observed along a normal of the first substrate. The electrode on the second substrate has a structure including openings formed entirely on partially at positions overlapped with symmetrical axes of the electrodes on the first substrate when observed along a normal of the first substrate.

Preferably, the viewing-angle controller member is formed by a film having a property of dispersing light within a specific angle, or a film having a function of transmitting light incident with a specific angle distribution to have another angle distribution. As the film, a diffusing film with a property of forward dispersion or a film whose refractive index varies according to the position (e.g., "Lumisty", Sumitomo Chemical Co., Ltd.).

Figure 9A:
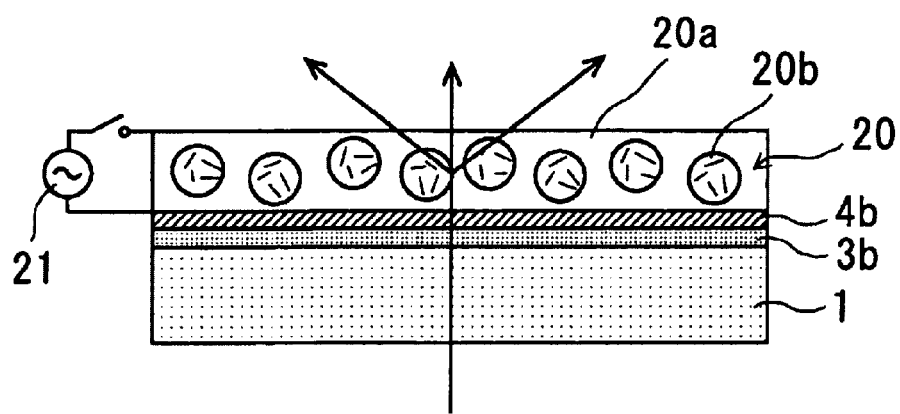
FIGS. 9A and 9B are schematic, partial cross-sectional views showing the structure of the viewing-angle controller used for the LCD device according to the invention, respectively.
Figure 9B:
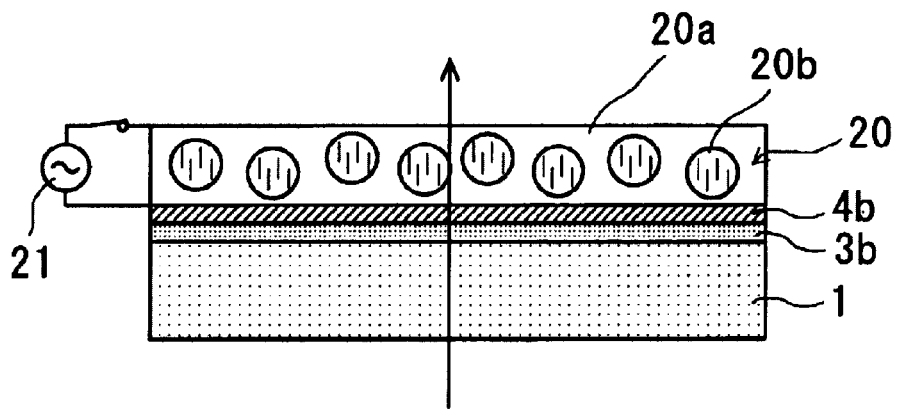

To facilitate the switching operation between wide and narrow viewing angles, it is preferred that the viewing-angle controller member is formed to be easily detachable. Moreover, instead of the detachable viewing-angle controller member, the member may be formed by using a polymer-dispersed liquid crystal layer 20, as shown in FIGS. 9A and 9B. The layer 20 contains a polymer matrix 20a and liquid crystal particles or drops 20b dispersed in the whole matrix 20a. In this case, a proper voltage is applied across the layer 20 with a voltage source 21. When no voltage is applied, the layer 20 is in its dispersion state, as shown in FIG. 9A, in which a wide viewing angle is obtainable. When a voltage is applied, the layer 20 is in its transmission or alignment state, as shown in FIG. 9B, in which a narrow viewing angle is obtainable. Thus, the switching operation between the wide and narrow viewing angles can be performed easily by turning the voltage on and off.

If the viewing-angle controller member is provided, this member gives the function of widening the viewing angle. Therefore, it is unnecessary for the liquid crystal layer to have a wide viewing angle. This means that a desired mode of the liquid crystal can be selected from a wider range of the existing operation modes. Moreover, a liquid crystal cell or section with a large value of the product (Δn·d) (i.e., retardation) can be employed to improve the response speed and to reduce the driving voltage. This is because the viewing-angle controller member provides the function of widening the viewing angle.

The value of (Δn·d) (i.e., retardation) of a liquid crystal cell or layer may vary slightly dependent on the mode of a liquid crystal. For example, a cell with the value of (Δn·d) as large as 400 nm to 800 nm can be used instead of a cell with the value as large as 300 nm to 400 nm. In this case, it is preferred that the cell thickness d is as small as possible. However, if the cell thickness d is too small, there arises a disadvantage that signal transmission in the wiring lines will delay and the writing ability of the TFTs will degrade. Thus, the cell thickness d needs to be optimized. In the embodiment of the invention that includes the viewing-angle controller member, where the viewing angle of the cell itself may be narrow, a thickness value of the cell may be selected from the range of 2 μm to 15 μm according to the value of Δn and the driving voltage. This widens the range of selection.

In the LCD device of the invention, the polarization state of incident light is changed with the combination of the first polarization member and the first quarter wave member, and then, it is introduced into the liquid crystal layer. Thus, there is no need to accurately aligning the axes of two polarization members located at each side of the liquid crystal layer, which gives redundancy to the fabrication processes. In particular, when the vertical alignment mode is used in the normally black mode, the following advantages are obtainable.

Specifically, with the vertical alignment mode in the normally black mode, the orientation of the liquid crystal molecules is perpendicular to the substrate if no voltage is applied. Thus, the retardation is zero with respect to the incident light perpendicular to the substrate. This means that even if the thickness of the liquid crystal cell fluctuates, the black pixel does not turned to a white one. In the LCD device of the invention, only the light incident perpendicularly to the first substrate is used and therefore, the vertical alignment mode is advantageous particularly.

In this way, the LCD device of the invention is of high contrast and circularly polarized light can be introduced into the liquid crystal layer. Thus, if the liquid crystal molecules are simply inclined by application of a voltage, the screen or pixels will be bright independent of the inclination direction. As a result, there are additional advantages that orientation control of liquid crystal molecules (e.g., rubbing) is unnecessary, the freedom of designing pixels is improved, and possible selection range of liquid crystal is widened. Furthermore, no negative compensation film is necessary to widen the viewing angle and thus, retardation adjustment between the film and the liquid crystal layer is unnecessary, which facilitates fabrication of the device.

In the case of the vertical alignment mode in the normally white mode, if the liquid crystal molecules are simply inclined by application of a voltage, the screen will be dark independent of the inclination direction. As a result, there are additional advantages that orientation control of liquid crystal molecules (e.g., rubbing) is unnecessary, the freedom of designing pixels is improved, and possible selection range of liquid crystal is widened. Furthermore, no negative compensation film is necessary to widen the viewing angle. This is the same as the normally black mode.

If horizontally alignment films are used for the first and second substrate, and a voltage is applied across the liquid crystal layer that has orientated homogeneously to incline the liquid crystal molecules, the residual retardation needs to be compensated in order to compensate the black display state, independent of whether the normally black or white mode is employed. Thus, a mono-axial positive or negative retardation compensation film is attached in such a way that the residual retardation is zero. At this stage, the positive retardation compensation film is located in such a way that the optical axis of the compensation film is perpendicular to the optical axis of the liquid crystal. The negative retardation compensation film is located in such a way that the optical axis of the compensation film is parallel to the optical axis of the liquid crystal. As a result, it is preferred that the initial orientation of the liquid crystal molecules is aligned in the same direction.

These are applicable to the other horizontal modes, such as the bend alignment mode for fast response, and HAN (Horizontally Alignment Nematic) mode where the horizontal and vertical alignments are applied to the first and second substrates, respectively.

In particular, with the active matrix addressing type where the respective pixels are driven by switching elements such a TFTs, highly placement accuracy is required for positional alignment between the color filter layer and the pixel electrodes. However, if the color filter layer and the switching elements are provided on the same substrate, the positional alignment between the first and second substrates is unnecessary. This is advantageous to fabrication processes.

In the invention, the first and/or second quarter wavelength member(s) may be located closer to the liquid crystal section. In this case, the advantage about parallax is not obtainable. However, there are other advantages that the climate-resistance is improved and the quarter wavelength member(s) itself/themselves can be used as an alignment layer or layers.

Specifically, with the climate-resistance, the quarter wavelength member in question is located in the liquid crystal section and therefore, it is never affected by UV (ultraviolet) light and humidity after it is assembled. Moreover, since UV light is absorbed not only by the first polarizer member but also by the thick substrate made of glass or plastic, almost all UV light is prevented from reaching the quarter wavelength member. As a result, degradation due to UV light can be remarkably decreased compared with the case where the quarter wavelength member is located outside the section. Additionally, the quarter wavelength member is scarcely affected by humidity.

Moreover, adhesion between the polarizer member and the quarter wavelength member is unnecessary. Thus, a proper adhesive whose adhesion performance has bee know well may be used for adhesion between the polarizer member and the glass or plastic for the substrate. In other words, the adhesive between the polarizer member and the quarter wavelength member is likely to detached or separated due to humidity. However, by locating the quarter wavelength member in the section, this problem can be solved. Therefore, the selection range of the material for the quarter wavelength member can be widened and the other performances (e.g., transmittance) can be easily enhanced.

Regarding the alignment, if the first or second quarter wavelength plate is located in the liquid crystal section, the quarter wavelength plate itself may be made of a material with a property of liquid crystal. Thus, the plate itself has a function of aligning the liquid crystal molecules. If the horizontal alignment is used, the orientation processing (e.g., coating of an orientation material or film, rubbing, and so on) is unnecessary for at least one of the first and second substrates.

To widen the wavelength dispersion, a half wavelength member may be used along with the quarter wavelength member. In this case, the half wavelength member may be made of a material with a property of liquid crystal. If so, the same advantage as that of the case where only the quarter wavelength member is located in the section is obtainable.

If the two quarter wavelength members are used, to cancel the birefringence property of the plates themselves, it is preferred that one of the plates has a positive optical anisotropy (i.e., birefringence) and the other has a negative one, as disclosed in the Japanese Non-Examined patent Publication No. 5-113561 published in 1993.

With the LCD device of the invention, there is no necessity to apply "alignment division" to the liquid crystal section. However, if alignment division is preferred from the viewpoint of brightness uniformity in the panel and response speed, alignment division may be applied. If so, alignment division may be realized by a known method, such as forming a protrusion, forming slits on the electrodes on the first and second substrates to divide the vertical alignment into parts, or changing the pretilt angle for part of the pixels by irradiation of light to divide the vertical or homogeneous alignment. However, the following structures, which have been created while paying attention to the size and shape of the electrodes, are advantageous, because they increase no fabrication process steps.

Figure 10A:
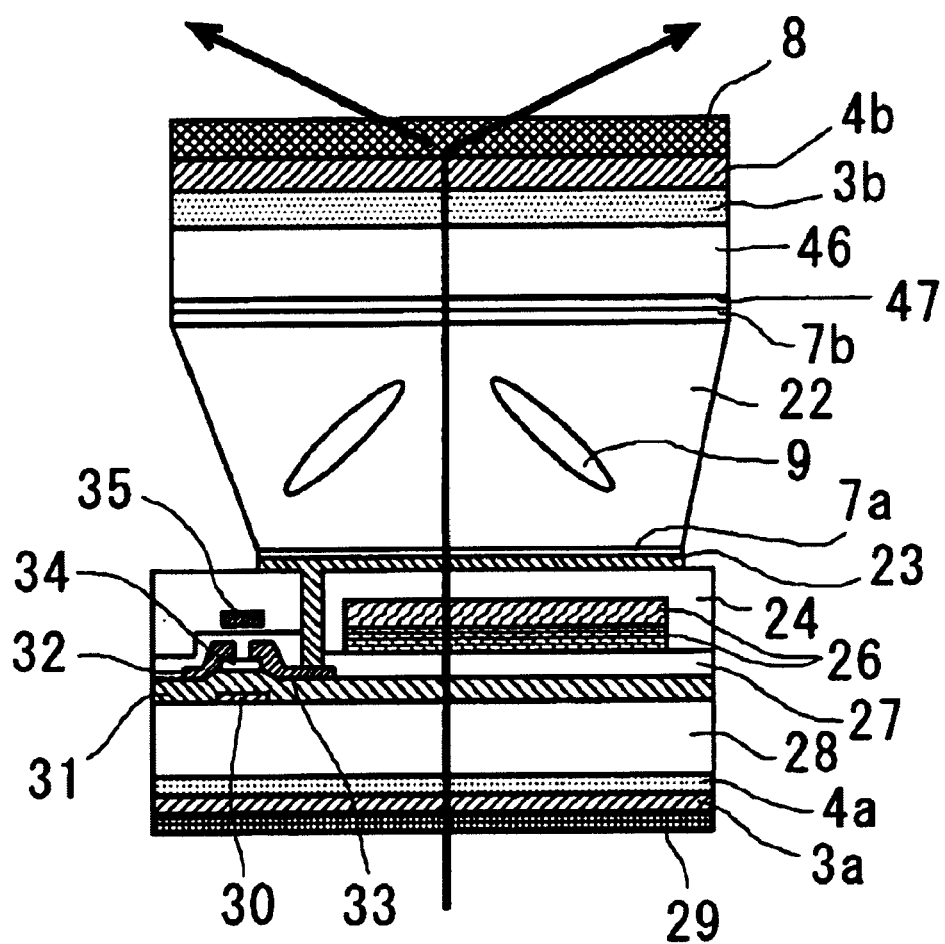
FIG. 10A is a schematic, partial cross-sectional view along the line XA—XA in FIG. 10B, which shows the structure of the LCD device according to the invention to which alignment division of liquid crystal molecules is applied.
Figure 10B:
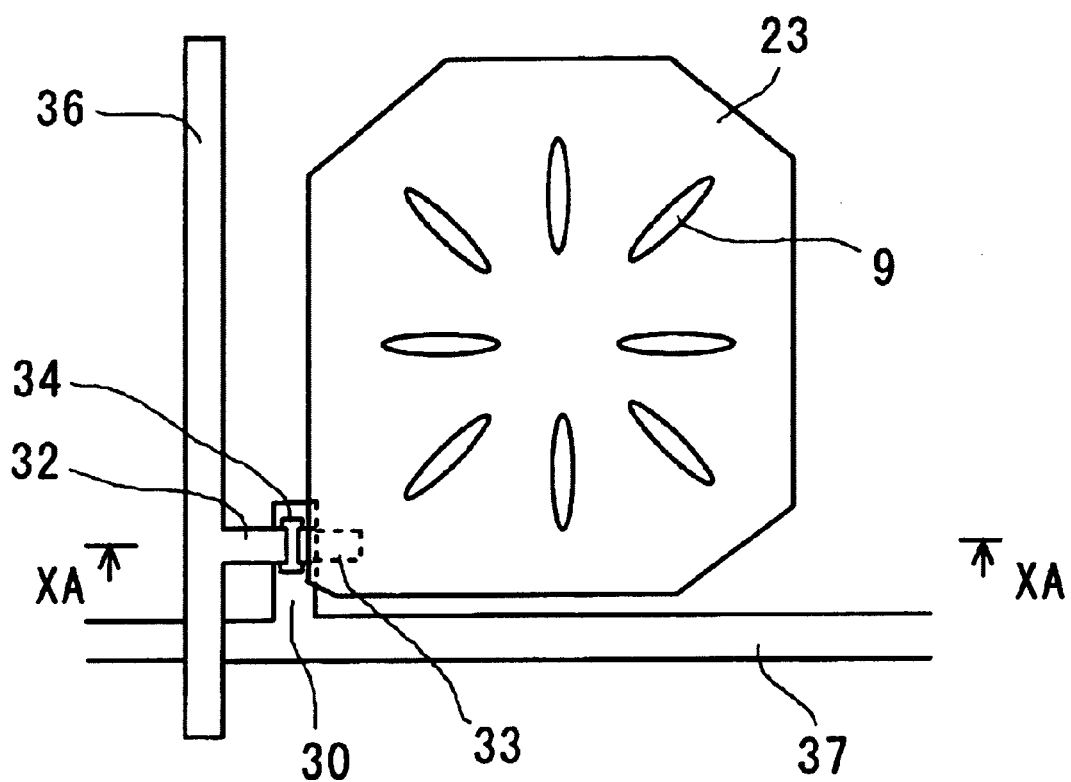
FIG. 10B is a schematic, partial plan view showing the structure of the LCD device of FIG. 10A.

Specifically, the electrodes on the first substrate are formed to have good symmetry while the electrode(s) on the second substrate is/are formed to cover the electrodes on the first substrate, where the electrode(s) on the second substrate is/are wider than the electrodes on the first substrate. Here, the wording "good symmetry" means the shape of a circle, or a regular polygon having three vertexes or more, e.g., triangle, square, pentagon, hexagon, . . . , as shown in FIG. 11. If so, oblique electric fields are generated with good vertical symmetry, as shown in FIGS. 10A and 10B. Thus, if the liquid crystal is aligned vertically and has a negative dielectric anisotropy, the inclining direction of the liquid crystal molecules is plural, resulting in alignment division of the liquid crystal. In this case, a division boundary is formed at the center of the pixel by the naturally generated oblique electric-field and thus, the molecules are inclined from the edges of the pixel toward its center. If the pixel electrode is formed to have a symmetry, the molecules are inclined from the edges of the pixel electrode toward it center and as a result, the alignment of the molecules is divided accordingly. The above-described regular polygon needs not be accurately polygon. It may be deformed to some extent.

Figure 12:
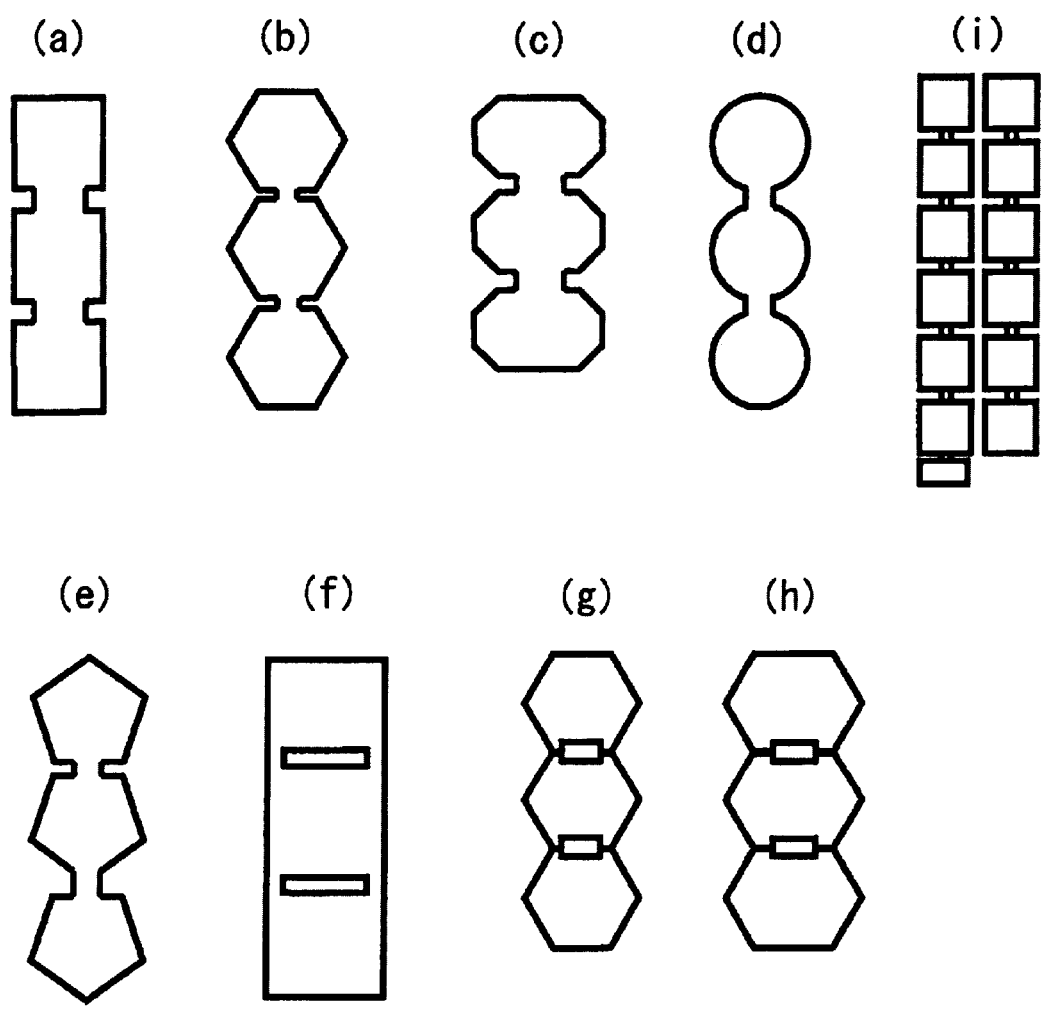
FIG. 12 is schematic partial plan views showing examples of the shape of the pixel electrode of the LCD device according to the invention.
Figure 14:
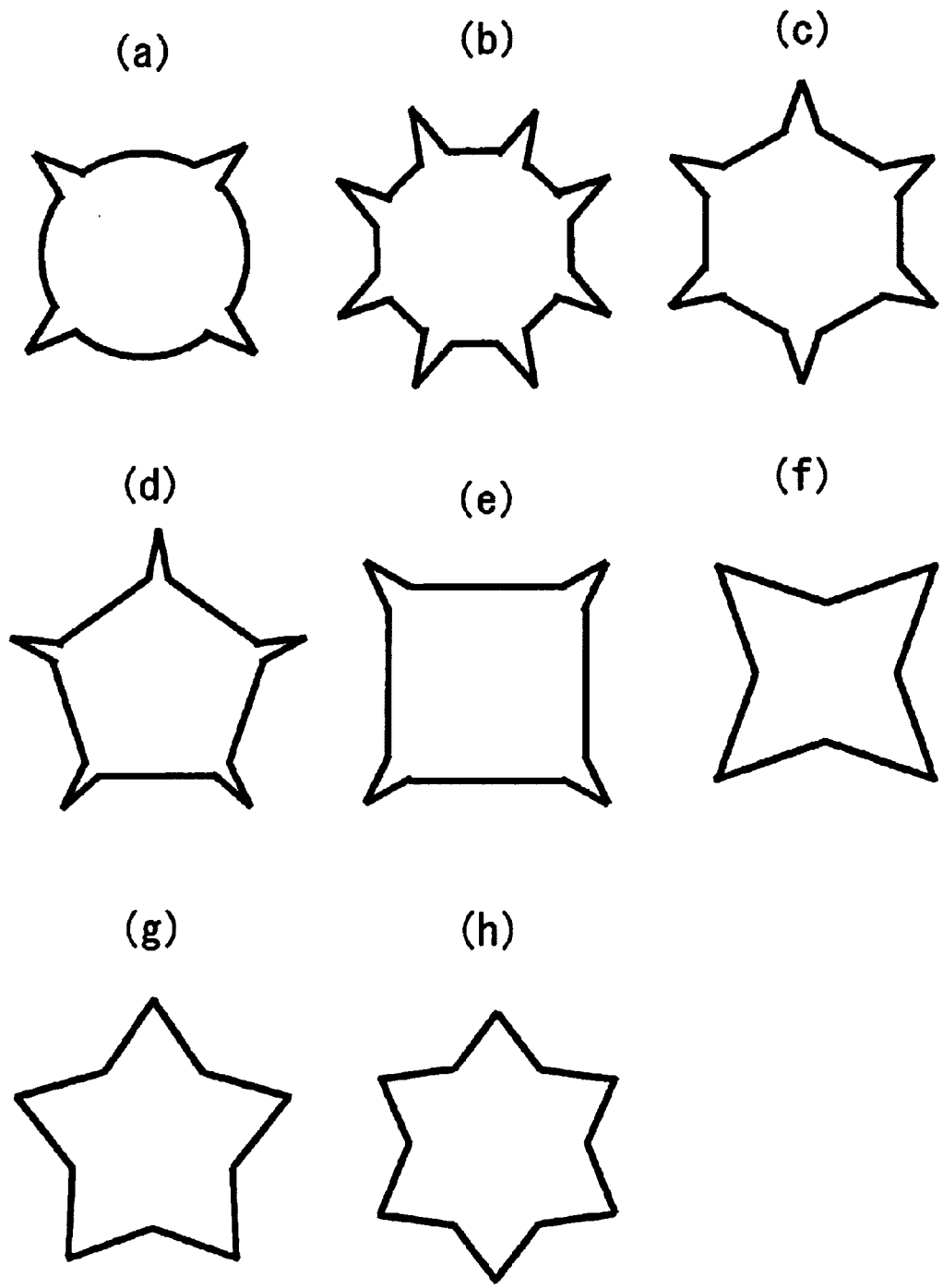
FIG. 14 is schematic partial plan views showing examples of the shape of the pixel electrode of the LCD device according to the invention.

Typical LCD devices have rectangular pixel electrodes. However, as shown in FIG. 12, it is preferred that some cuts are formed in the pixel electrode to be a series of symmetric shapes. In this case, the above-described alignment division is possible at the part of the electrode corresponding to each symmetric shape. Thus, there is the same advantage as the case where the whole pixel electrode is symmetrically formed. As shown in FIGS. 13 and 14, cuts or protrusions may be additionally applied to each electrode on the first substrate. In this case, the alignment division is promoted.

Figure 15A:
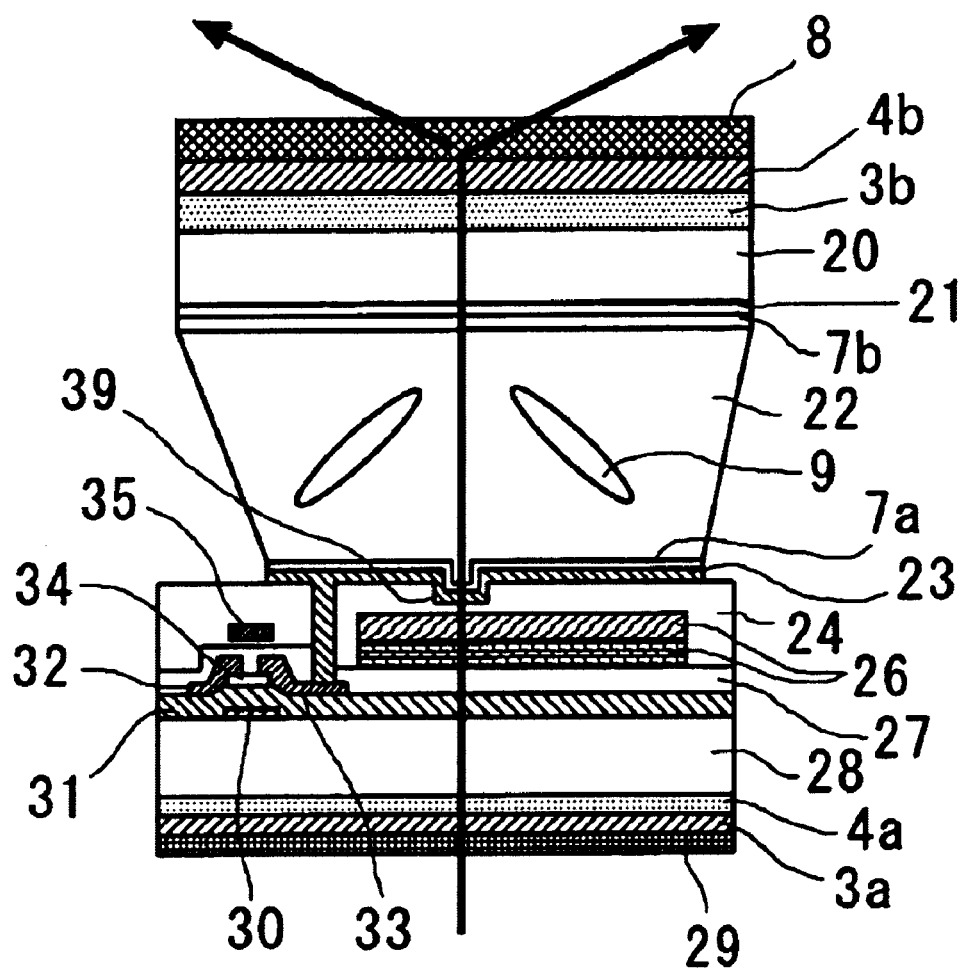
FIG. 15A is a schematic, partial cross-sectional view along the line XVA—XVA in FIG. 15B, which shows the structure of the LCD device according to the invention to which alignment division of liquid crystal molecules is applied.
Figure 15B:
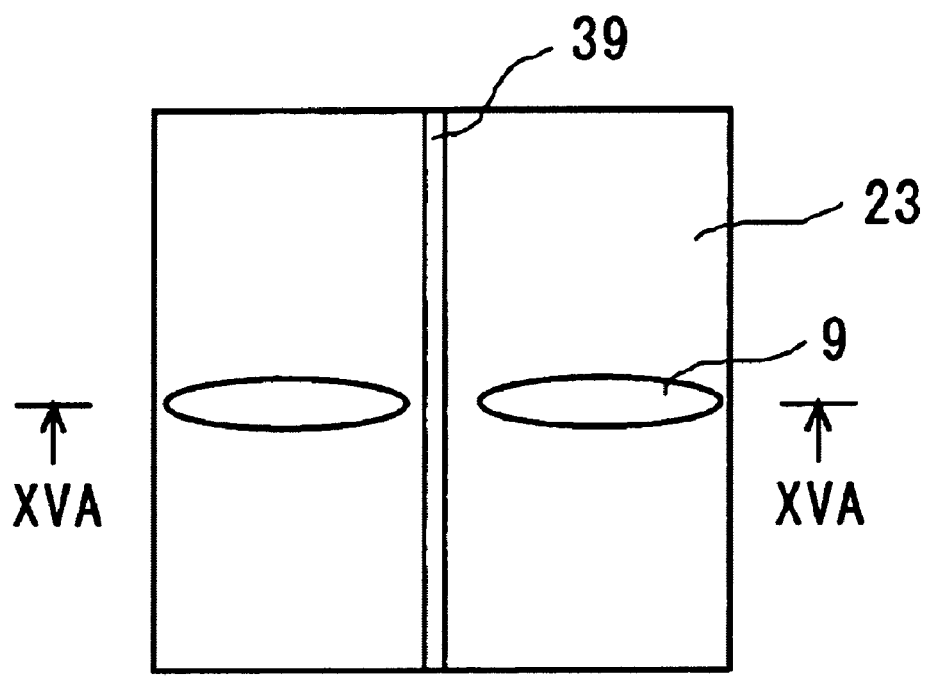
FIG. 15B is a schematic, partial plan view showing the structure of the LCD device of FIG. 15A.
Figure 16:
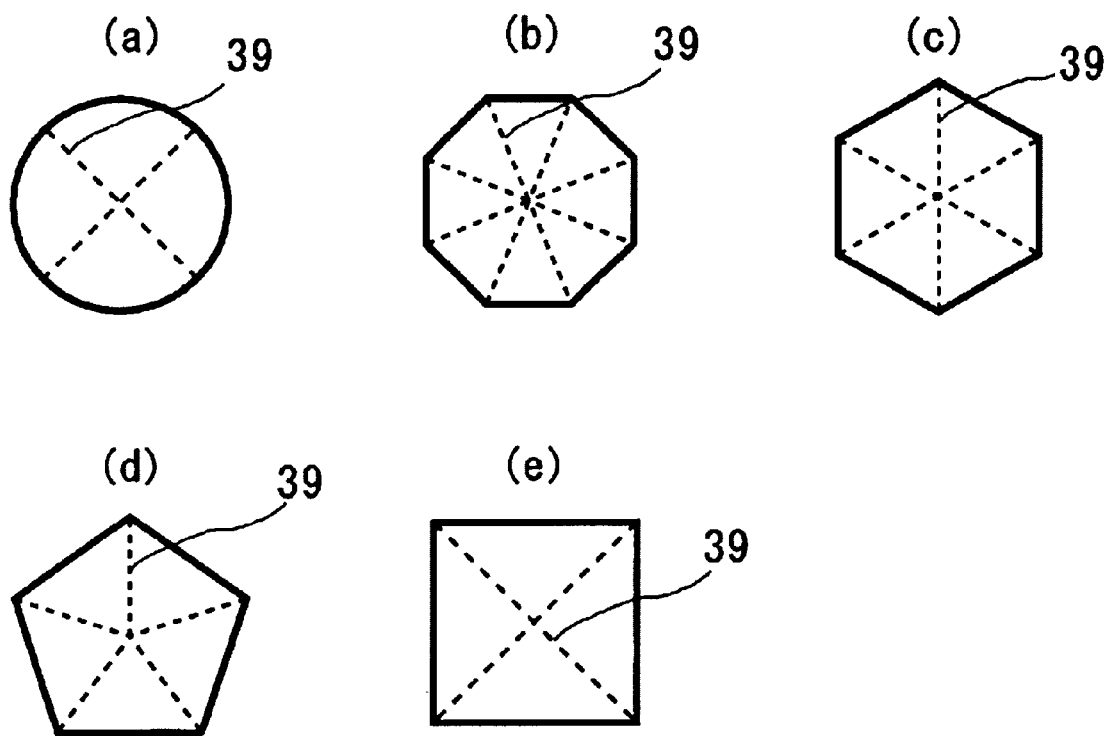
FIG. 16 is schematic partial plan views showing examples of the shape of the pixel electrode of the LCD device according to the invention.
Figure 17A:
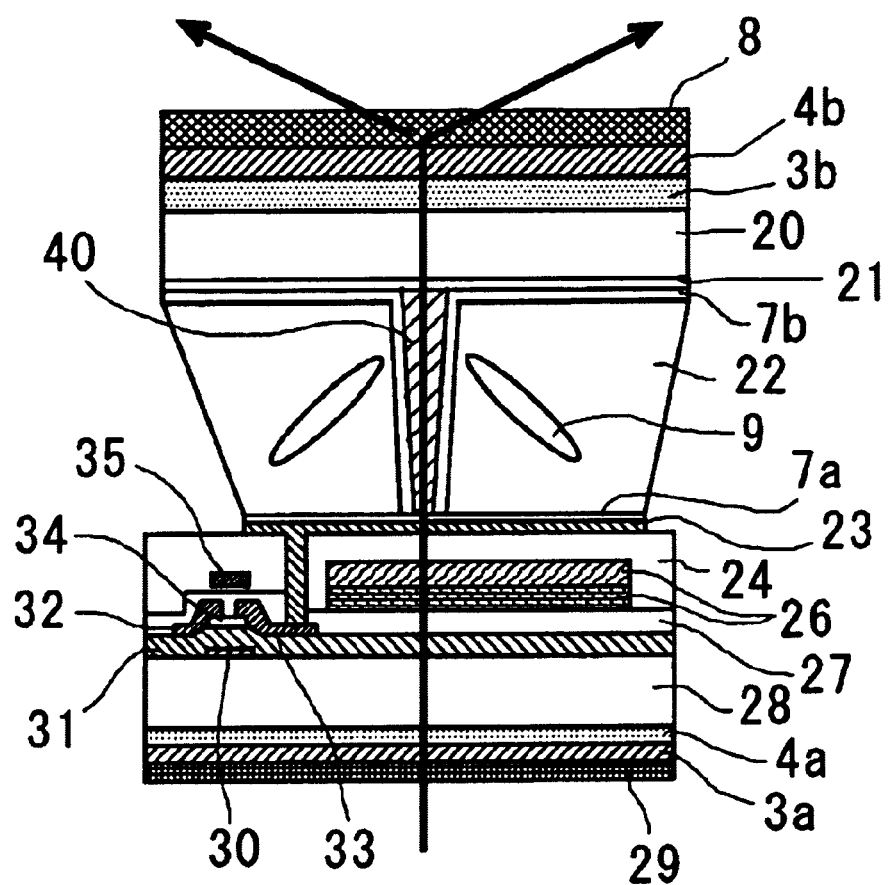
FIG. 17A is a schematic, partial cross-sectional view along the line XVIIA—XVIIA in FIG. 17B, which shows the structure of the LCD device according to the invention to which alignment division of liquid crystal molecules is applied.
Figure 17B:
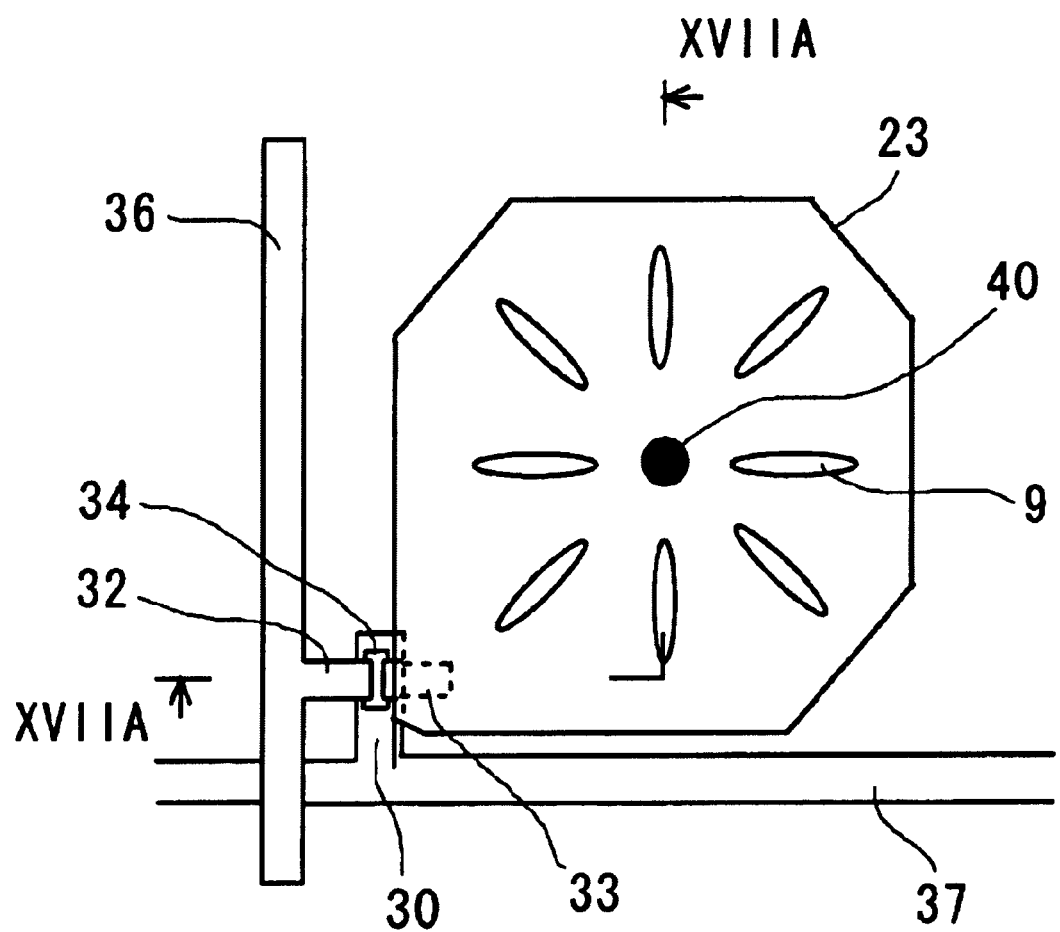
FIG. 17B is a schematic, partial plan view showing the structure of the LCD device of FIG. 17A.
Figure 18:
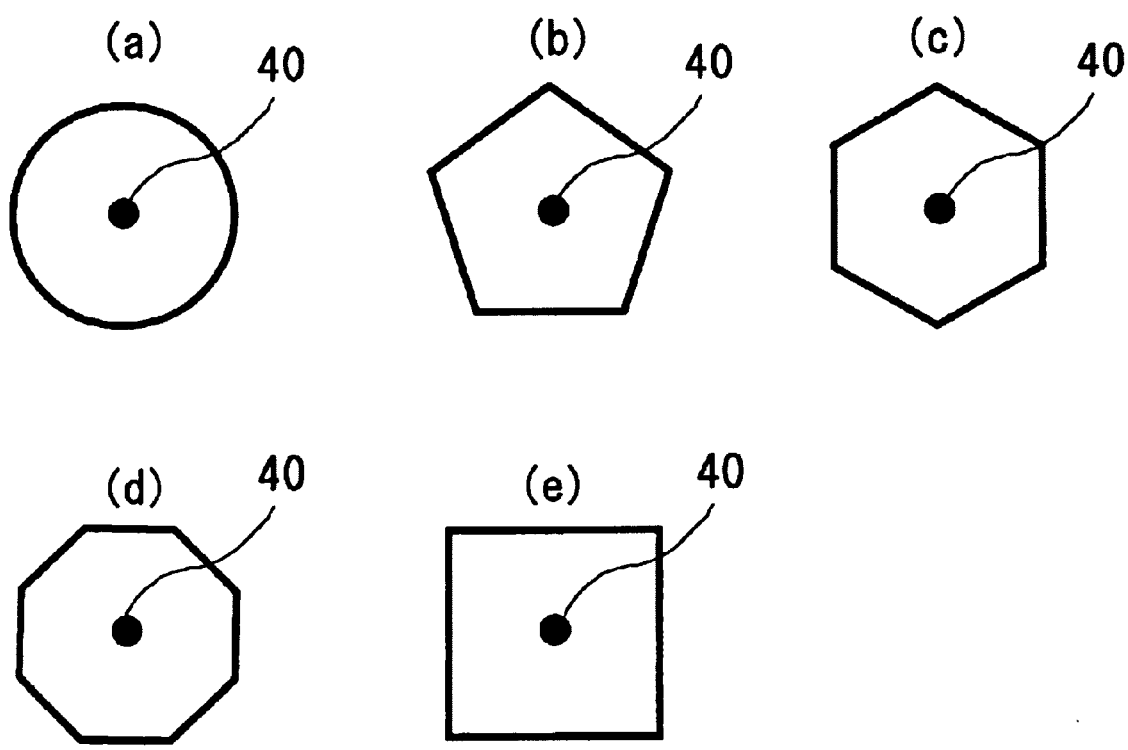
FIG. 18 is schematic partial plan view showing examples of the shape of the pixel electrode of the LCD device according to the invention.
Figure 19:
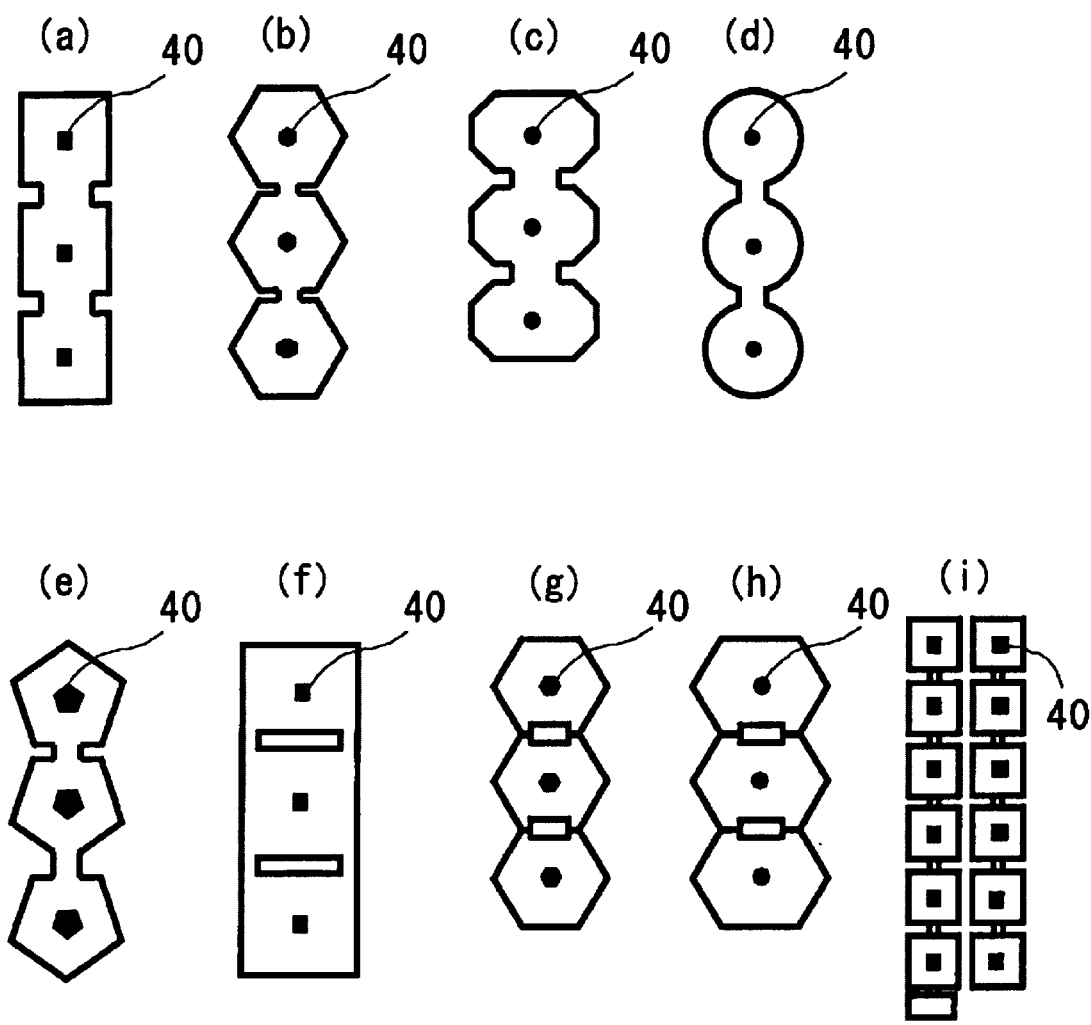
FIG. 19 is schematic partial plan views showing examples of the shape of the pixel electrode of the LCD device according to the invention.

To ensure the position of the alignment division, as shown in FIGS. 15A and 15B and FIG. 16, the electrode may be formed to have a depression 39. These structures or shapes may be combined together. Preferably, the depression 39 is formed to enter the underlying overcoat layer 24 In this case, the depression 39 can be formed at a desired large depth without complicating the formation processes. Thus, the boundary of alignment division is securely fixed.

With the vertical alignment of the liquid crystal molecules, the molecules are stabilized to form a spiral alignment under application of a voltage. Preferably, a chiral agent is added to stabilize the alignment more, thereby raising the response speed. The cut or depression of the pixel electrode may be spiral in each pixel.

Figure 20A:
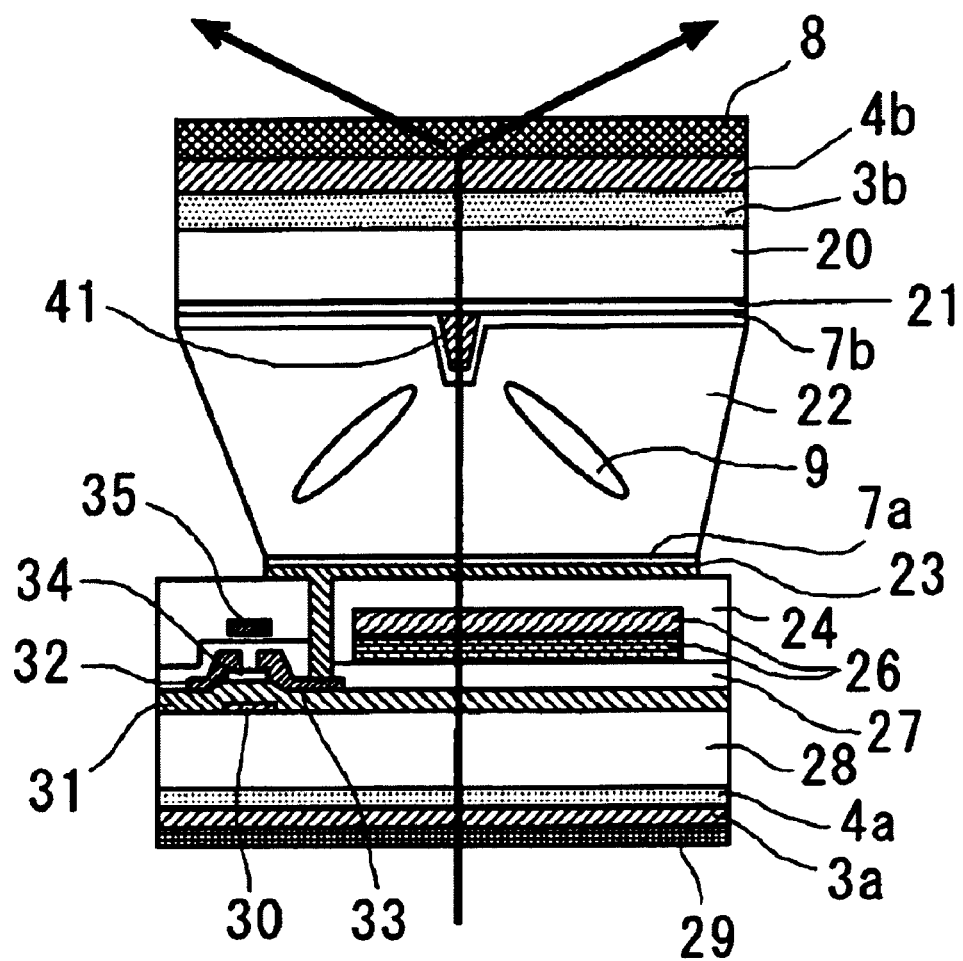
FIG. 20A is a schematic, partial cross-sectional view along the line XXA—XXA in FIG. 20B, which shows the structure of the LCD device according to the invention to which alignment division of liquid crystal molecules is applied.
Figure 20B:
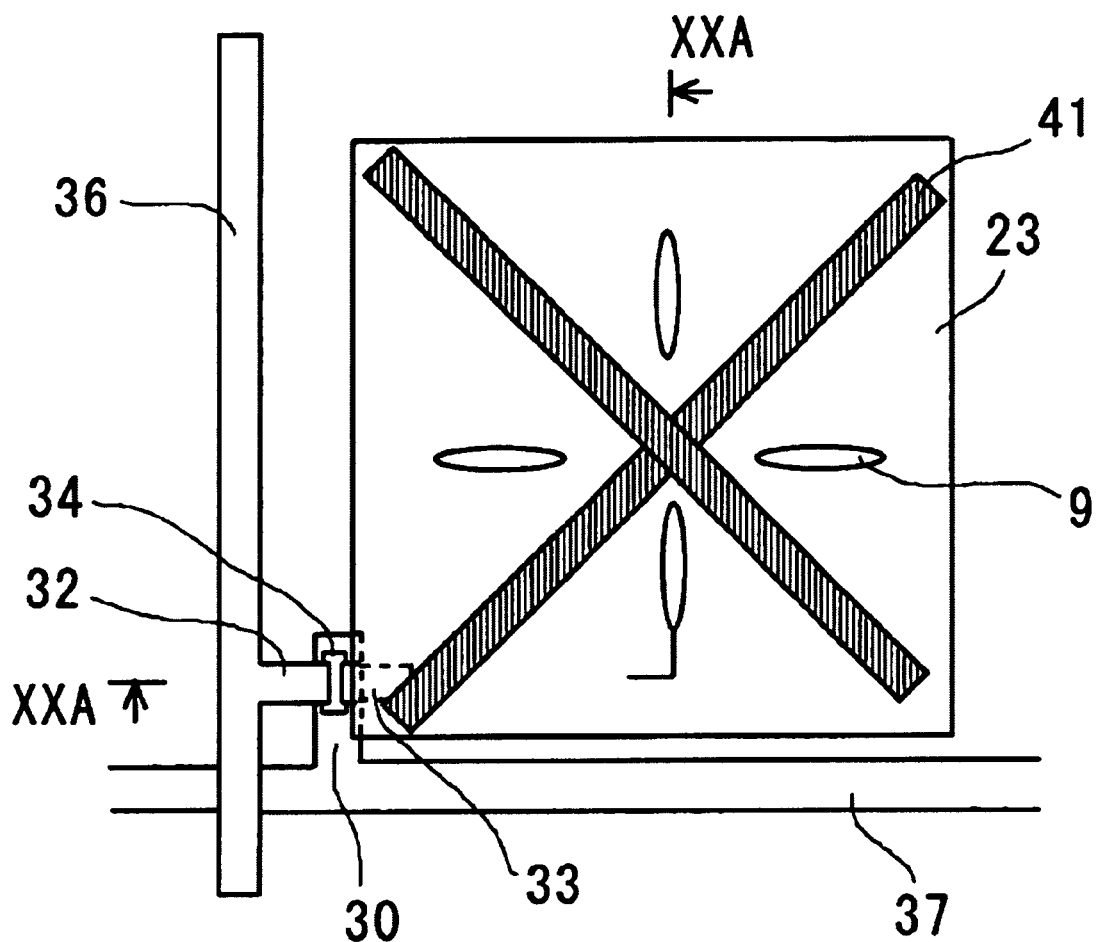
FIG. 20B is a schematic, partial plan view showing the structure of the LCD device of FIG. 20A.

As shown in FIGS. 17A and 17B and FIGS. 18 and 19, a column or pillar 40 may be provided as a spacer at approximately the symmetrical center of the pixel electrode with a good symmetry. The column 40 is used as the nucleus or core of orientation division, which makes the division smooth. As shown in FIGS. 20A and 20B, for the same purpose, a protrusion 41 may be formed at the division boundary of the common electrode on the second substrate. If the protrusion 41 is projected on the electrode with a symmetry, the position of the protrusion 41 is in accordance with the position of the column 40 shown in FIGS. 18 and 19. Moreover, for the same purpose, an opening may be formed at a part of the symmetrical common electrode on the second substrate, which corresponds approximately to the symmetrical center of the pixel electrode on the first substrate.

With the LCD device of the invention, preferably, a voltage is applied across the pixel electrodes and the common electrode to control the initial alignment of the liquid crystal molecules and then, the polymerizing monomers or oligomers mixed into the liquid crystal at a small quantity is polymerized, thereby increasing the certainty or reliability of the initial alignment. When controlling the initial alignment, the liquid crystal layer is heated to turn the liquid crystal to its isotropic phase. Thereafter, the temperature is lowered while applying a voltage across the common electrode and the pixel electrodes, or a voltage is simply applied across the common electrode and the pixel electrodes. The reaction of the monomers or oligomers may be caused before or during the heating process, or after the cooling process. If the initial alignment is controlled by applying a voltage across the common electrode and the pixel electrodes at room temperature, the reaction may be caused before or after application of a voltage. At this stage, the alignment division can be made by an ordinary driving method and therefore, the process of applying a voltage to the second or control electrode, which is disclosed in the Japanese Non-Examined patent Publication No. 10-20323 published in 1998, is unnecessary.

As explained previously, the method of fabricating a LCD device according to the third aspect of the invention comprise the steps of (a) providing a first substrate whose surface is deformable by irradiation of laser light; and (b) irradiating laser light having a specific intensity profile corresponding to respective pixels to the surface of the first substrate, thereby forming microlenses on the first substrate.

With the method of the invention, the pretilt angle may be controlled in advance according to a desired alignment division pattern by an optical alignment method, thereby increasing the certainty of the initial alignment control. If so, the effect of the oblique electric field and that of the pretilt angles are applied synergically, the alignment division can be realized by far effectively compared with the case were one of the oblique electric field and the pretilt angles is applied. For example, any material containing a functional group (e.g., the cinnamic acid group) having a property that the alignment division of the liquid crystal molecules is controllable by application of polarized light may be used. Alternately, a polymer material or materials having a property that the photosensitive agent is polymerized by application of polarized light, which is disclosed in a paper, AM-LCD '96/IDW 96 Digest of Technical Papers, p337, may be used. In this case, one of these materials is used to form the alignment layer and then, polarized light is obliquely irradiated to the alignment layer by way of a mask in such a way that desired pretilt angles are formed according to the alignment division. If the count of the vertexes or sides of a regular polygon is too many, the count of necessary behaviors for the optical alignment increases. Thus, the count of vertexes of a polygon is preferably set at eight to four (i.e., octagon to square).

These alignment division methods are well known. Even with these methods, the divided alignment can be maintained by the reaction of the polymerizing monomers or oligomers mixed into the liquid crystal at a small quantity.

The monomers and oligomers applicable to the invention are optically setting monomers, thermosetting monomers, and these oligomers. If a material contains one of these monomers or oligomers, it is applicable to the invention, even if it contains other component or components. The wording of the "optically setting monomers and oligomers", which are applicable to the invention, means not only monomers and oligomers to be set by visible light but also those to be set by UV light. The latter (i.e., UV-set monomers and oligomers) is preferred, because handling is easier.

Any polymer material is applicable to the invention if it has a similar structure to the molecules of a liquid crystal, in addition to the monomers or oligomers that represent a liquid crystal property. However, the polymer material is not be used to make the orientation of a liquid crystal. Therefore, any polymer material having flexibility (e.g., a polymer containing alkylene chains) is applicable. The polymer material having flexibility may include a single functional group, two functional groups, or multiple functional groups (three or more functional groups).

Samples of optically or UV setting monomers applicable to the invention are as follows, which are acrylate compounds with a single functional group.

2-ethylhexyl acrylate, buthylethyl acrylate, butoxyethyl acrylate, 2-cyanoethyl acrylate, benzyl acrylate, cyclohexyl acrylate, 2-hydroxypropyl acrylate, 2-ethoxyethyl acrylate, N,N-ethylaminoethyl acrylate, N,N-dimethylaminoethyl acrylate, dicyclopentanyl acrylate, dicyclopentenyl acrylate, glycidyl acrylate, tetrahydrofurfurryl acrylate, isobonyl acrylate, isodecyl acrylate, lauryl acrylate, morpholine acrylate, fenoxyethyle acrylate, fenoxydiethyleneglycol acrylate, 2,2,2-trifluoroethyle acrylate, 2,2,3,3,3-pentafluoropropyl acrylate, 2,2,3,3-tetrafluoropropyl acrylate, 2,2,3,4,4,4-hexafluorobutyl acrylate Samples of optically or UV setting monomers applicable to the invention are as follows, which are metacrylate compounds with a single functional group.

2-ethylhexyl matacrylate, buthylethyl matacrylate, butoxyethyl matacrylate, 2-cyanoethyl matacrylate, benzyl matacrylate, cyclohexyl matacrylate, 2-hydroxypropyl matacrylate, 2-ethoxyethyl matacrylate, N,N-ethylaminoethyl matacrylate, N,N-dimethylaminoethyl matacrylate, dicyclopentanyl matacrylate, dicyclopentenyl matacrylate, glycidyl matacrylate, tetrahydrofurfurryl matacrylate, isobonyl matacrylate, isodecyl matacrylate, lauryl matacrylate, morpholine matacrylate, fenoxyethyle matacrylate, fenoxydiethyleneglycol matacrylate, 2,2,2-trifluoroethyle matacrylate, 2,2,3,3-tetrafluoropropyl matacrylate, 2,2,3,4,4,4-hexafluorobutyl matacrylate Samples of optically or UV setting monomers applicable to the invention are as follows, which are acrylate compounds with multiple functional groups.

4,4'-biphenyl diacrylate, diethylstilbestrol diacrylate, 1,4-bisacryloil oxybenzen, 4,4'-bisacryloil oxy-diphenyl ethel, 4,4'-bisacryloil oxy-diphenyl methane, 3,9-bis[1,1-dimethyl-2-acryloil oxy-ethyl]-2,4,8,10-tetraspiro[5,5] undecane, α, α'-bis[4-acryloil oxy-phenyl]-1,4-diisopropyl benzene, 1,4-bisacryloil oxy-tetrafulorobenzene, 4,4'-bisacryloil oxy-octafulorobiphenyl, diethylene glycol diacrylate, 1,4-butanediol diacrylate, 1,3-butylene glycol diacrylate, dicyclopentanil diacrylate, glycerol diacrylate, 1,6-hexanediol diacrylate, neopentilglycol diacrylate, tetraethylene glycol diacrylate, trimethylol propane triacrylate, pentaerythritol teteraacrylate, pentaerythritol triacrylate, ditrimetirol ditrimethylol propane tetraacrylate, dipentaerythritol hexaacrylate, dipentaerythritol monohydroxy pentaacrylate, 4,4'-diacryloil oxy-stilbene, 4,4'-diacryloil oxydimethyl stilbene, 4,4'-diacryloil oxydiethyl stilbene, 4,4'-diacryloil oxydiprophyl stilbene, 4,4'-diacryloil oxydipentyl stilbene, 4,4'-diacryloil oxydihexyl stilbene, 4,4'-diacryloil oxydifluoro stilbene, 2,2,3,3,4,4-hexafluoro pentane diol-1,5-diacrylate, 1,1,2,2,3,3-hexafluoropropyle-1,3-diacrylate, urethane acrylate oligomer Samples of optically or UV setting monomers applicable to the invention are as follows, which are metacrylate compounds with multiple functional groups.

diethylene glycol dimetacrylate, 1,4-butanediol dimetacrylate, 1,3-butylene glycol dimetacrylate, dicyclopentanil dimetacrylate, glycerol dimetacrylate, 1,6-hexanediol dimetacrylate, neopentil glycol dimetacrylate, tetraethylene glycol dimetacrylate, trimethylol propane trimetacrylate, pentaerythritol tetrametacrylate, pentaerythritol trimetacrylate, ditrimethylol propane tetrametacrylate, dipentaerythritol monohydroxi pentametacrylate, 2,2,3,3,4,4-hexafluoro pentane diol-1,5-dimetacrylate, urethane metacrylate oligomers Additionally, styrene, aminostyrene, and vinyl acetate maybe used for this purpose.

The invention is not limited to these materials listed here.

The driving voltage of the LCD device according to the invention is affected by the interaction at the interface between the polymer material and the liquid crystal. Thus, any polymer material containing fluorine (F) may be used, examples of which are as follows.

2,2,3,3,4,4-hexafluoro pentane diol-1,5-dimetacrylate, urethane metacrylat, 1,1,2,2,3,3-hexafluoropropyle-1,3-diacrylate, 2,2,2-trifluoroethyle acrylate, 2,2,3,3,3-pentafluoropropyle acrylate, 2,2,3,3-tetrafluoropropyl acrylate, 2,2,3,4,4,4-hexafluorobutyl acrylate, 2,2,2-trifluoroethyle acrylate, 2,2,3,3-tetrafluoropropyl metacrylate, 2,2,3,4,4,4-hexafluorobutyl metacrylate, urethane acrylate oligomer When an optically or UV set monomer is used as the optically or UV set polymer material for the invention, an initiating agent for light or UV maybe used. Any agent may be used for the initiating agent, examples of which are as follows.

[Acetophenone System]
2,2-diethoxy acetophenone, 2-hydroxy-2-methyl-1-phenyl-on, 1-(4-isopropylphenyl)-2-hudroxy-2-methyl propane-1-on, 1-(4-dodecylphenyl)-2-hydroxy-methyl propane-1-on

[Benzoin System]
benzoin methyl ether, benzoin ethyl ether, benzoin methyl ketal

[Benzophenone System]
benzophenone, o-benzoylbenzoate, 4-phenyl benzophenone, 3,3-dimethyl-4-methoxybenzophenone

[Thioxianthone System]
thioxianthone, 2-chlorthioxianthone, 2-methylthioxianthone, Diazonium salts, sulfonium salts, iodonium salts, and selenium salts may be used for this purpose.

If the pixels are arranged at sufficient intervals, the orientation division of the liquid crystal molecules does not arise any problem. However, if the pixels are arranged closely to each other, it is preferred to use the dot-inversion driving method that voltages are supplied to the adjacent pixels in such a way that the polarity (i.e., positive or negative) of the voltages are opposite to each other. If so, the oblique electric fields are generated in the more preferred directions, which leads to desired orientation division. Furthermore, to make the sharpness better in displaying moving pictures, a resetting operation to return to the black display state within each frame may be added.

In a preferred embodiment of the invention, the LCD device comprises a first substrate located on the input side, a second substrate fixed to be opposite to the first substrate on the output side, and a liquid crystal layer ((i.e., a liquid crystal cell) interposed between the first and second substrates. The liquid crystal layer or cell contains a liquid crystal. The liquid crystal layer and the first and second substrates constitute a liquid crystal section.

As a collimator for collimating its incident light, a microlens array is provided on the input side. As the input light, light emitted from a backlight source is used. The array is united with the first substrate. A first polarization controller is located on the input side, which includes a first polarizer member and a first quarter wavelength member. On the output side, a second polarization controller is located, which includes a second polarizer member and a second quarter wavelength member.

As a result, before the input light is introduced into the liquid crystal cell, the input light is collimated and the polarization state of which is converted to circularly polarized light. Then, the circularly polarized light passes through the liquid crystal section. Thereafter, the polarization state of this light is converted to form the output light.

Therefore, the quantity of the transmission of light can be controlled according to the phase difference, which is independent of the inclination of orientation of the liquid crystal molecules. Thus, alignment layers and their rubbing processing are unnecessary. At the same time, a liquid crystal whose transmittance anisotropy is large is available and therefore, high-speed response that copes with displaying moving pictures can be realized.

DETAILED DESCRIPTION OF THE PREFERRED EMBODIMENTS

Preferred embodiments of the present invention will be described in detail below while referring to the drawings attached.

First Embodiment

Figure 2:
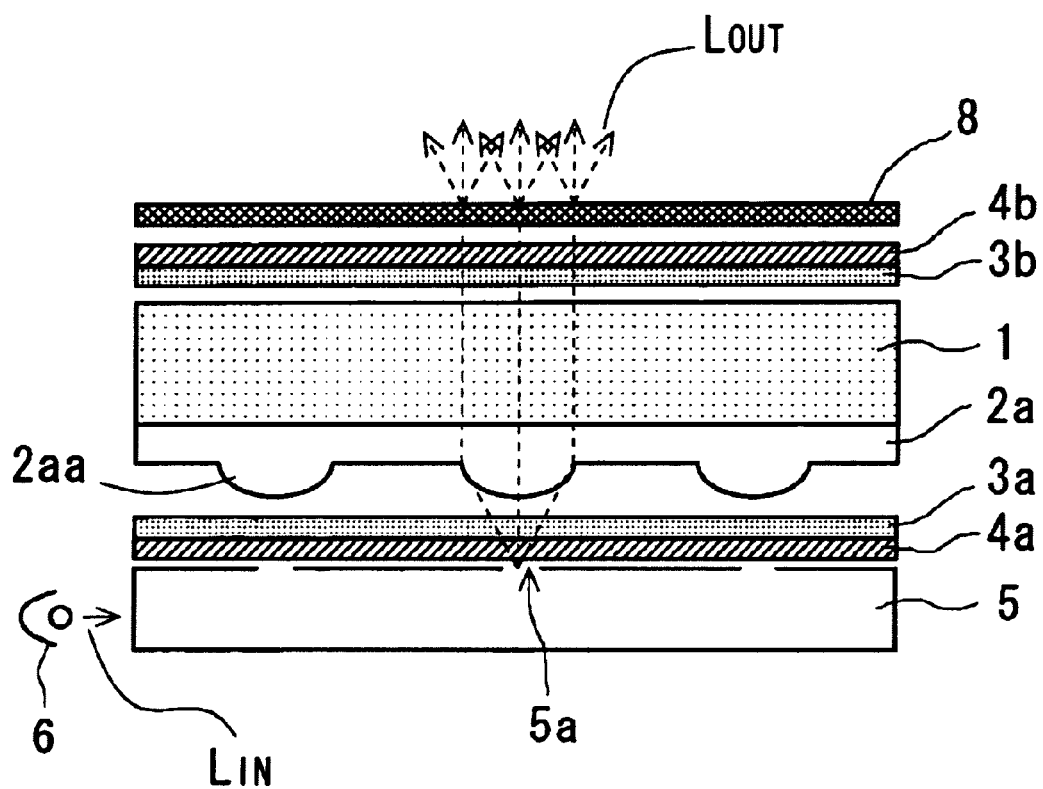
FIG. 2 is a schematic, partial cross-sectional view showing the structure of a LCD device according to the first embodiment of the invention.

FIG. 2 shows the structure of a LCD device according to a first embodiment of the invention. FIGS. 3A and 3B and 4A to 4D show the operation principle of the device, respectively.

The LCD device of FIG. 2 comprises a liquid crystal section or cell 1 having a first substrate, a second substrate, and a liquid crystal layer. The first and second substrates are fixed in parallel to each other while the liquid crystal layer is interposed between these two substrates. Switching elements such as TFTs are formed on the first substrate. Thus, the first substrate may be termed the "TFT substrate", and the second substrate may be termed the "counter or opposite substrate".

The LCD device further comprises a microlens array 2a, quarter wavelength (λ/4) plates 3a and 3b, polarizer plates 4a and 4b, a light guide plate 5, a light source 6, and a viewing-angle controller plate 8. The microlens array 2a, the quarter wavelength plate 3a, the polarizer plate 4a, the guide plate 5, and the light source 6 are located on the input side of the LCD device. The quarter wavelength plate 3b, the polarizer plate 4b, and the viewing-angle controller plate 8 are located on the output side thereof.

The microlens array 2a is united with the input side surface of the section 1. The light source 6 generates and emits backlight $L_{IN}$ toward the guide plate 5. The polarizer plate 4a and the quarter wavelength plate 3a, which operate in combination as a polarization controller, convert the backlight $L_{IN}$ to circularly polarized light and then, introduce the circularly polarized light thus generated into the microlens array 2a.

The polarizer plate 4b and the quarter wavelength plate 3b, which operate in combination as a polarization controller, pass selectively the light that has passed through the section 1 to the output side. The viewing-angle controller plate 8 diffuses the light that has passed through the plate 4b to improve the viewing angle characteristics, resulting in the output light $L_{OUT}$.

Although the detailed structure of the liquid crystal section 1 is not illustrated, any structure may be used if it generates electric fields approximately perpendicular to the first and second substrates by applying a voltage across the electrodes on the first substrate and the electrode on the second substrate, thereby changing the orientation of the liquid crystal molecules to be normal to these substrates. The color filter for displaying color images may be located on the second substrate (i.e., the ordinary structure) or on the first substrate (i.e. the CF-or-TFT structure).

An example of the CF-on-TFT structure is shown in FIGS. 10A and 10B. As shown in these figures, gate lines 37 and gate electrodes 30 are formed on a TFT substrate 28. Semiconductor layers or islands 34 are formed over the substrate 28 by way of a common gate dielectric 31 in such a way as to overlap with the corresponding gate electrodes 30. Drain lines 36 are formed over the corresponding gate electrodes 32 to be perpendicular to the gate lines 37. Source electrodes 33 and drain electrodes 32 are connected to the semiconductor islands 34 by way of ohmic contact layers (not shown), thereby forming TFTs. A passivation layer 27 is formed to cover the TFTs. A color filter 26 is selectively formed on the layer 27 to cover the display areas of the pixels.

On the color filter 26, an overcoat layer 24 is formed to planarize the surface of the TFT substrate assembly. Pixel electrodes 23 are connected to the corresponding source electrodes 33 by way of contact holes that penetrate the overcoat layer 24 and the passivation layer 27.

On the other hand, a common, counter or opposite electrode 47 is formed on the counter substrate 46 in such a way as to be opposite to the pixel electrodes 23. Alignment layers 7a and 7b are formed on the inside surfaces of the substrates 28 and 36, respectively. Specific alignment processing in a specific direction is applied to each of the layers 7a and 7b. The liquid crystal layer 22 is sandwiched by the layers 7a and 7b.

As shown in FIG. 2, the microlens array 2a, which is united with the bottom surface of the TFT substrate 28, has convex microlenses 2aa arranged at the corresponding positions to the pixels. The shape and focal points of the lenses 2aa are determined in such a way that the light emitted from the windows 5a of the guide plate 5 propagates through the section 1 in the form of collimated light for each pixel. The lenses 2aa serve as point sources of light. Therefore, instead of the combination of the light source 6 and the guide plate 5, light-emitting diodes arranged in a matrix array may be formed.

The reference numerals 9 and 35 denote the liquid crystal molecule and light-shielding layers, respectively.

The method of forming the array 2a is explained later in a third embodiment in detail. Since the array 2a is integrated with the TFT substrate 28, there is an additional advantage that positional alignment of the constituent elements of the device is facilitated.

Specifically, with a LCD device using collimated light, the incidence position and incidence angle of incident light need to be aligned correctly with respect to the position of the pixels. If the liquid crystal section 1 and the array 2a are formed separately and thereafter, they are combined together, there arise disadvantages that the light is not irradiated to the whole pixel, and/or that the light is obliquely irradiated to the pixel with respect to the normal of the substrate 28, which are due to positional shift. Unlike this, if the substrate 28 and the array 2a are united together, the positional relationship (in particular, the angle) between them is correctly controlled. As a result, the disadvantages do not occur.

The quarter wavelength plates 3a and 3b may be formed by drawing a film made of polycarbonate or norbornadien resin whose name is "Arthone" made by JSR corp. Alternately, they may be formed by using a photosensitive monomer with a liquid crystal property. Specifically, an alignment layer is formed by coating, the alignment layer is subjected to a rubbing process in the direction for the optical axis of the quarter wavelength plate 4a, and a liquid crystal material with a photosensitive group disclosed in the Liquid Crystal, Vol. 18, p.319, 1995, is coated on the orientation layer. The thickness of the liquid crystal material layer thus formed is determined in such a way that the product ($\Delta n \cdot d$) of the optical anisotropy (i.e., birefringence) $\Delta n$ and the thickness d of the liquid crystal layer 22 is equal to the quarter wavelength ($\lambda/4$). Thereafter, UV light is irradiated to the liquid crystal material layer thus aligned to cause reaction of the photosensitive group to generate a linking structure, thereby securing the alignment pattern on the layer.

Instead of coating an ordinary alignment layer and applying a rubbing process to the layer thus coated, a photosensitive material may be used, as disclosed in Japanese Journal of Applied Physics, Vol. 31, p.2155, 1992. In this case, polarized light is irradiated to the material to form an orientation pattern. Thereafter, UV light is irradiated to the material in a similar way to make a linking structure, thereby securing the orientation pattern. In this case, polarized UV light may be used in order to improve the orientation degree.

As explained previously, the viewing-angle controller plate 8 is formed by a film than diffuses its incident light within a specific angle, or a film having a function of penetrating incident light with a specific angle distribution and emitting it at a different angle distribution. To make the wide and narrow viewing angles selective, the plate 8 is preferably formed detachable from the assembly of the device. Alternately, the plate 8 may be formed by using a polymer-dispersed liquid crystal layer 20, as shown in FIGS. 9A and 9B. When a voltage is not applied across the crystal layer 20, as shown in FIG. 8A, the light is distributed and a wide viewing angle is obtainable. When a voltage is applied across the crystal layer 20, as shown in FIG. 8B, the light is transmitted and a narrow viewing angle is obtainable. In this way, the wide and narrow viewing angles are switched by simply turning the application of voltage on and off.

Next, the operation of the LCD device according to the first embodiment is explained below with reference to FIGS. 3A and 3B and FIGS. 4A to 4D. In the following explanation, the vertical alignment mode is employed. However, any other mode may be used, where horizontal alignment layers are formed on the TFT and counter substrates 28 and 36 to form the homogeneous alignment of the liquid crystal molecules, and a normal electric field is applied to the liquid crystal with respect to the substrates 28 and 36 to cause inclination or rotation of the molecules. For example, the TN (Twisted Nematic) mode, STN (Super Twisted Nematic) mode, bended orientation mode (which may be called "π cell"), and amorphous TN mode are applicable to the invention.

Figure 3A:
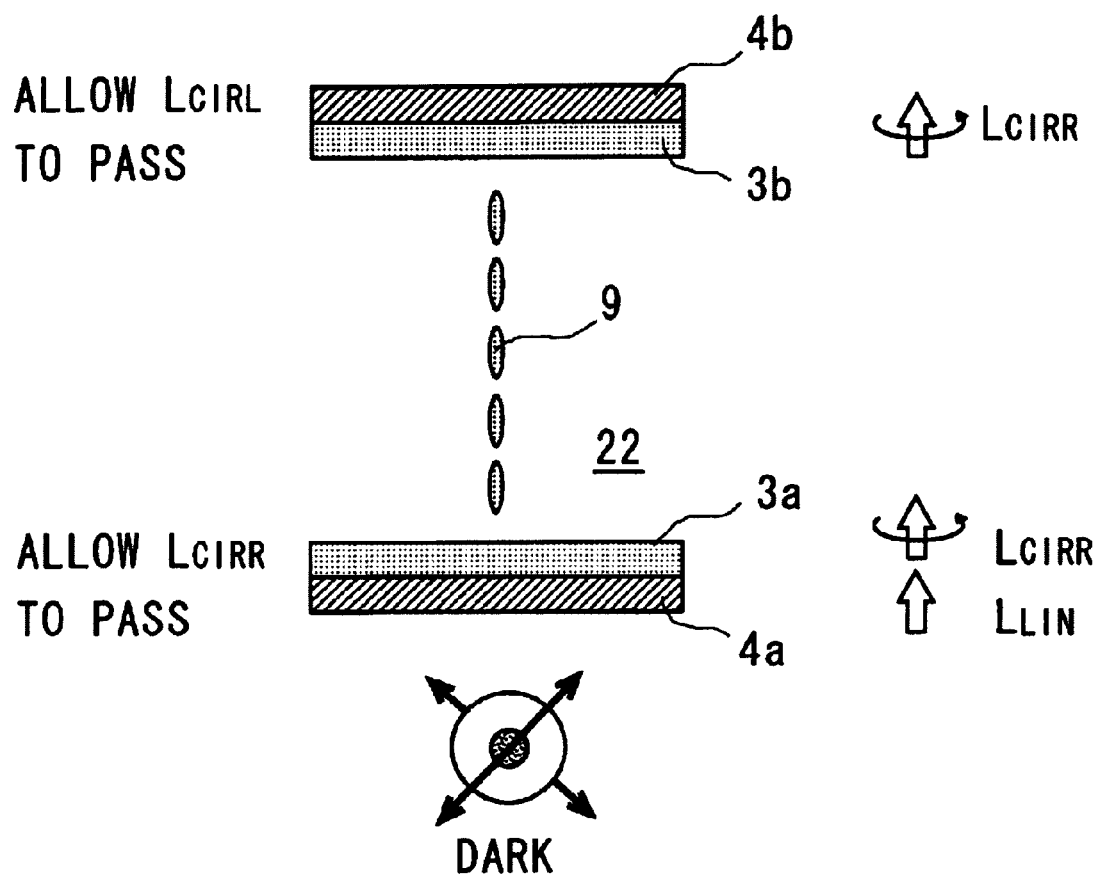
FIGS. 3A and 3B are schematic views showing the operation principle of the device according to the first embodiment of FIG. 2, respectively.
Figure 3B:
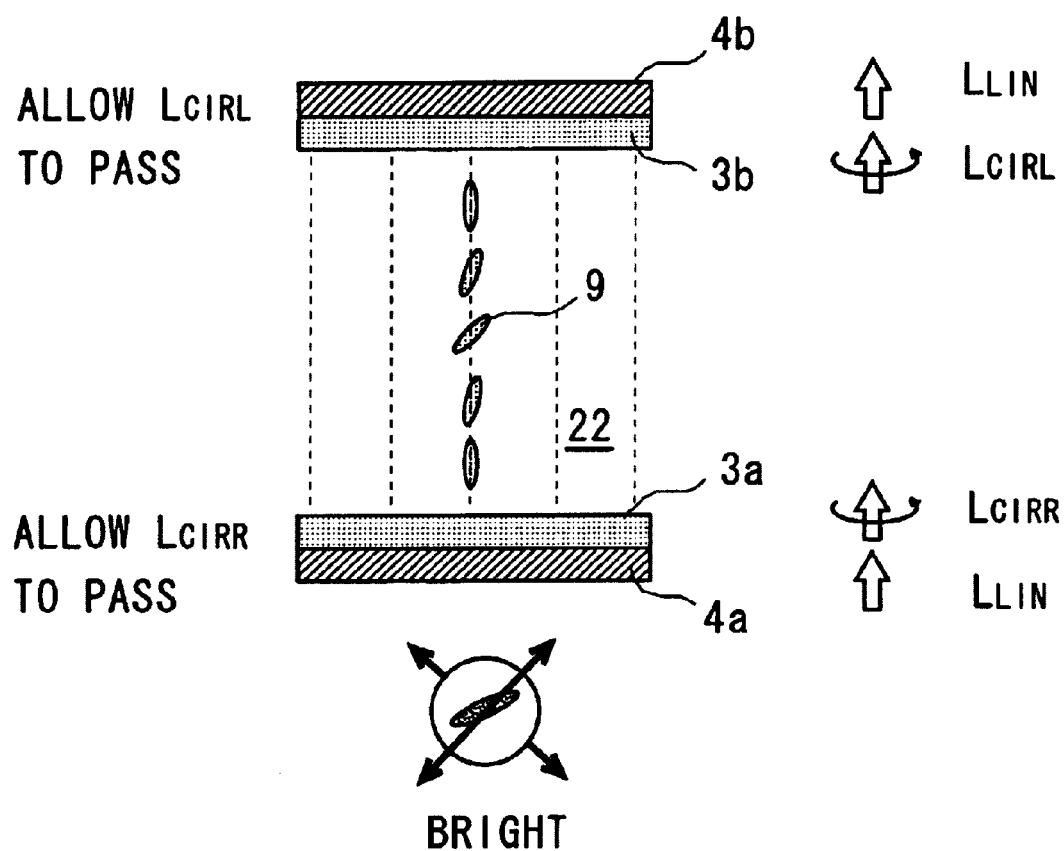

In FIGS. 3A and 3B, the polarizer plate 4a and the quarter wavelength plate 3a, which are located on the input side (i.e., on the lower side of the figures), allow only the right-handed circularly polarized light $L_{CIRR}$ to pass. The polarizer plate 4b and the quarter wavelength plate 3b, which are located on the output side (i.e., on the upper side of the figures), allow only the left-handed circularly polarized light $L_{CIRL}$ to pass. The polarization directions of the plates 4a and 4b and the optical axes and the thicknesses of the plates 3a and 3b are adjusted to perform these functions. Concretely, the polarizer plates 4a and 4b constitute an orthogonal polarizer. The in-plane refractive index variation of the quarter wavelength plates 3a and 3b are opposite. The plates 3a and 3b are arranged in such a way that their optical axes are intersected with the polarization axes of the plates 4a and 4b at an angle of 45°.

However, the invention is not limited to this. Any other structure may be used if means for generating circularly polarized light (which is formed by the combination of a polarizer plate and a quarter wavelength plate) are provided at each side of the liquid crystal section 1. The polarization direction (i.e., right or left) of circularly polarized light is optionally determined.

FIG. 3A shows the state where no voltage is applied across the liquid crystal section 1 with the vertical alignment mode. The backlight $L_{IN}$ is collimated by the microlens array 2a and then, converted to the linearly polarized light $L_{LIN}$ by the polarizer plate 4a. By the quarter wavelength plate 3a, the ordinary and extraordinary components of the light $L_{LIN}$ are shifted in phase by 90°, resulting in the right-handed circularly polarized light $L_{CIRR}$. The light $L_{CIRR}$ thus generated is introduced into the liquid crystal section 1. In this state, the long axis of each elongated molecule 9 of the liquid crystal is orientated perpendicular to the substrate 28 and therefore, no phase shift occurs in the light $L_{CIRR}$. Then, the light $L_{CIRR}$ enters the quarter wavelength plate 3b on the output side, in which the light $L_{CIRR}$ is converted to linearly polarized light. However, the polarization direction of the polarizer plate 4b on the output side is set to be perpendicular to that of the plate 4a on the input side. Thus, the light does not penetrate the plate 4b. This means that the pixel in question is dark.

On the other hand, in the state of FIG. 3B, where a voltage is applied across the liquid crystal section 1. The molecules 9 are inclined toward the parallel direction to the substrate 28 due to the applied voltage and the elastic force of the molecules 9 themselves. The inclination angle of the molecules 9 increases as the position approaches the center of the liquid crystal section 1. If the right-handed circularly polarized light $L_{CIRR}$ is introduced into the layer 1, a phase difference occurs in the light $L_{CIRR}$ due to the birefringence property of the molecules 9, thereby changing the polarization state of the light $L_{CIRR}$. Since the thickness of the section 1 is adjusted in such a away that the phase difference is equal to π, the light $L_{CIRR}$ is converted to a left-handed circularly polarized light $L_{CIRL}$. The light $L_{CIRL}$ passes through the quarter wavelength plate 3b and the polarizer plate 4b. This means that the pixel in question is bright.

Here, the difference between the LCD devices of the first embodiment and the prior-art LCD device where the quarter wavelength plates 3a and 3b are removed is explained with reference to FIGS. 4A to 4D.

FIG. 4A shows the state of the prior-art device where no voltage is applied. The incident light is converted to linearly polarized light by the polarizer plate 4a and then, the linearly polarized light enters the liquid crystal layer 22. Since the molecules 9 are aligned in the normal direction of the plate 28, the light passes through the section or layer 22 without any change of the polarization direction. The light is blocked by the plate 4b and the pixel in question is dark.

FIG. 4B shows the state of the prior-art device where a voltage is applied. The incident light is converted to linearly polarized light by the polarizer plate 4a and then, the linearly polarized light enters the liquid crystal layer 22. Due to the applied voltage, the molecules 9 are inclined toward the parallel direction to the substrate 28. In this state, if the inclination angle of the molecules 9 is 45° with respect to the polarization direction of the plates 4a and 4b, the light passes through the layer 1 and the plate 4b. As a result, the pixel in question is bright.

However, if the inclination angle of the molecules 9 is unequal to 45° with respect to the polarization direction of the plates 4a and 4b, as shown in FIG. 4C, the polarization direction of the incident light and that of the plate 4b are not equal to each other. As a result, the pixel in question is dark.

Specifically, with the prior-art structure, the quantity of the transmitted light changes under application of voltage and thus, the contrast will degrade, unless the inclination direction of the molecules 9 due to the voltage is determined in advance. Unlike this, with the inventive structure, circularly polarized light enters the cell 1 and therefore, an equal phase difference occurs in the layer 22 independent of the inclination direction of the molecules 9, as shown in FIG. 4D. Thus, the quantity of the transmitted light is kept unchanged under application of voltage, which is a remarkable advantage. This means that the alignment layer is unnecessary and the rubbing process can be omitted.

This advantage is obtainable only when the incident light is collimated by the microlens array 2a, and the quarter wavelength plates 4a and 4b are respectively located at the input and output sides of the liquid crystal layer 22. Even if only the quarter wavelength plates 4a and 4b are located at the input and output sides of the liquid crystal layer 22, the phase difference will change dependent on the inclination direction of the molecules 9 if the light enters obliquely. Moreover, even if the incident light is collimated by the array 2a without providing the quarter wavelength plates 4a and 4b, the phase difference will change dependent on the inclination direction of the molecules 9. As a result, the advantages of the invention are not obtainable in these two cases. The formation of orientating layers and the rubbing process are essential therein.

By forming the microlens array 2a to be united with the TFT substrate 28, the positional relationship (in particular, the angle) between the array 2a and the substrate 28 can be controlled accurately. Since the incident light is converted to circularly polarized light by the combination of the polarizer plate 4a and the quarter wavelength plate 3a and then, enters the liquid crystal layer 1. Therefore, precise alignment of the axes of the plates 4a and 4b is unnecessary and at the same time, redundancy for the fabrication processes is available.

Moreover, if a liquid crystal having a large refractive index anisotropy is employed, high-speed response is obtainable as desired.

In particular, if the vertical alignment mode is applied to the normally black mode, the pixels are bright independent of the inclination direction of the molecules 9 if the molecules 9 are simply inclined by the applied voltage. Thus, there are advantages that orientation processes such as the rubbing one are unnecessary, the freedom of designing the pixels is increased, and the selection range of the liquid crystal material is widened. Moreover, the negative compensation layer for wide viewing angle is unnecessary and thus, the retardation between the compensation layer and the liquid crystal layer 1 is not necessary and the fabrication processes are facilitated.

Figure 21:
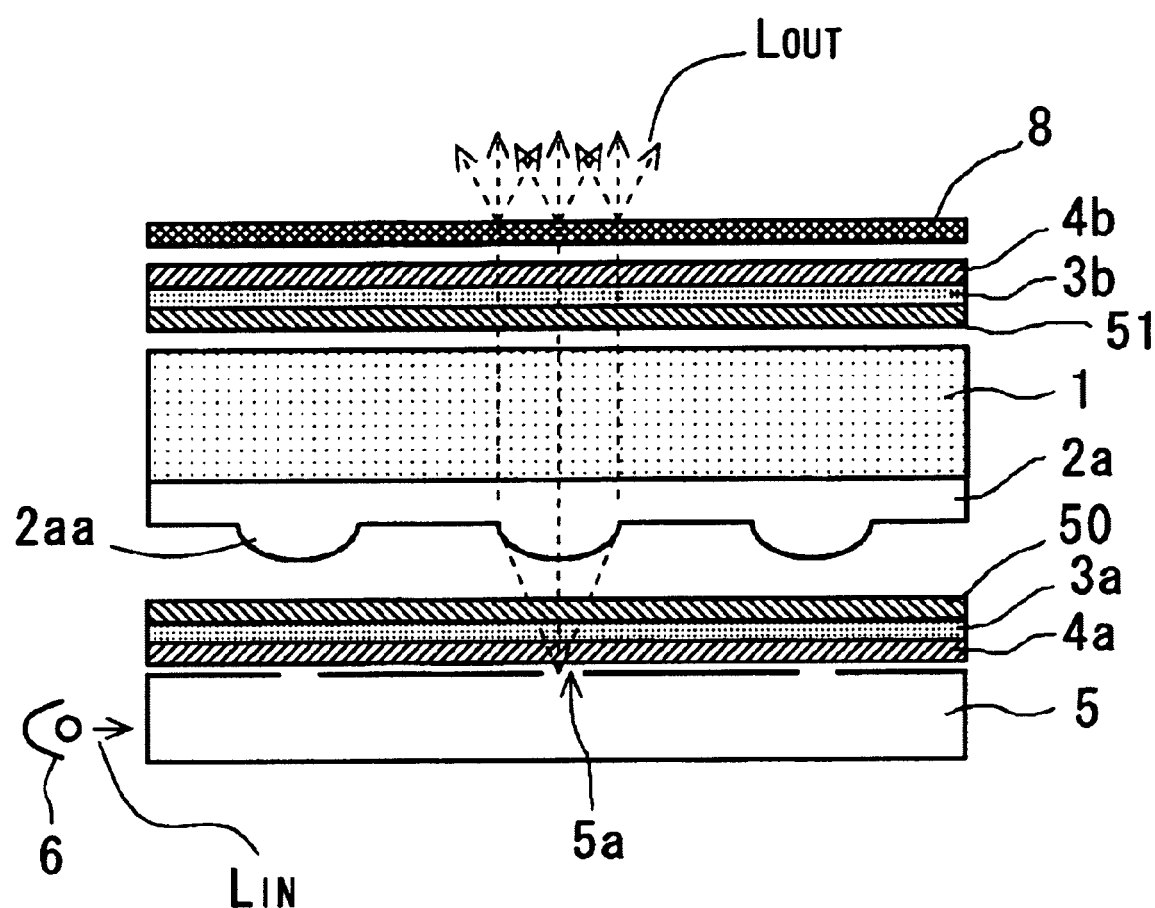
FIG. 21 is a schematic, partial cross-sectional view showing the structure of a variation of the LCD device according to the first embodiment of the invention.

Additionally, the quarter wavelength plates 3a and 3b may be located close to the liquid crystal section 1. A half wavelength plate 50 may be additionally provided between the first substrate and the first polarizer plate, and another half wavelength plate 51 may be additionally provided between the second substrate and the second polarizer plate, as shown in FIG. 21. This is to widen the wavelength dispersion range.

Figure 22:
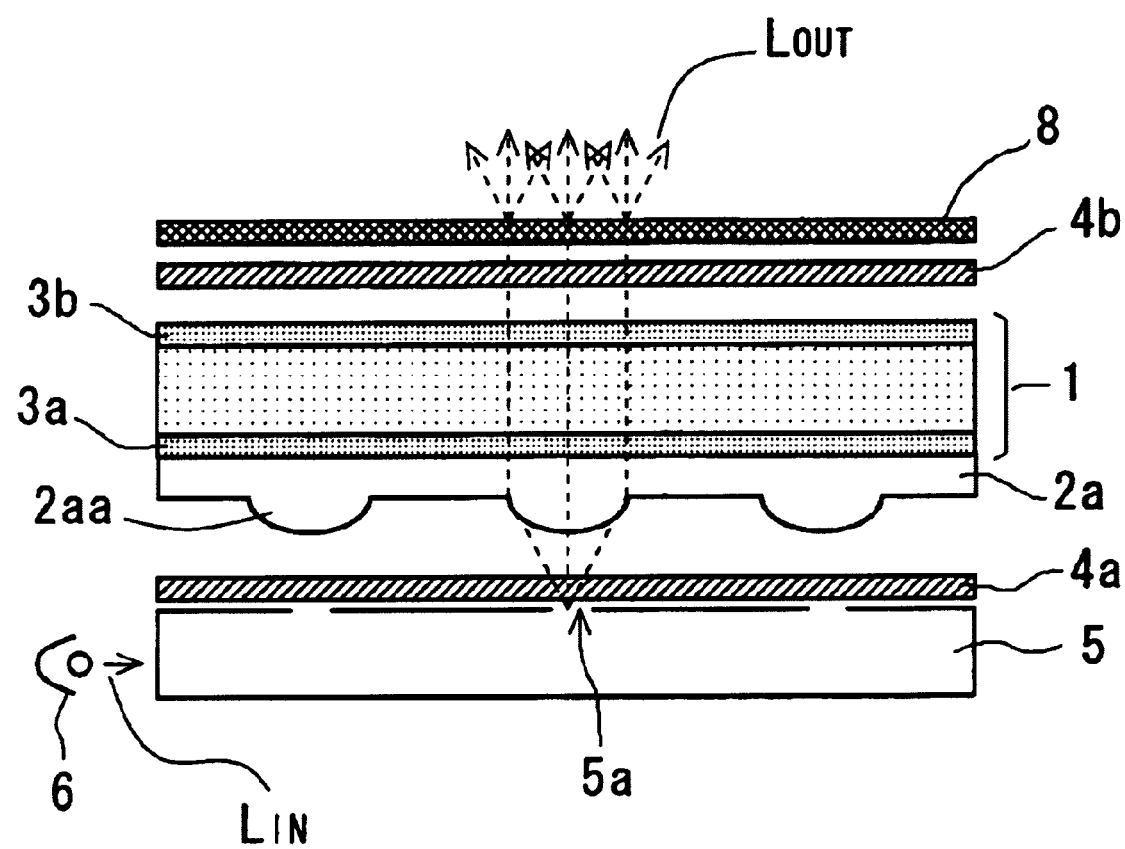
FIG. 22 is a schematic, partial cross-sectional view showing the structure of another variation of the LCD device according to the first embodiment of the invention.

As explained previously, the quarter wavelength plate 3a and 3b may be located in the liquid crystal section 1, as shown in FIG. 22.

To make alignment division, a depression or depressions or a protrusion or protrusions may be formed in the substrate. The pretilt angle may be changed by irradiating light for part of the pixel. The shape of the electrodes may be changed as shown in FIGS. 11 to 14. These are the same as explained previously.

Second Embodiment

FIG. 5 shows the structure of a LCD device according to a second embodiment of the invention. This device has the same configuration as the device of the first embodiment, except that the microlens array 2a is united with the guides plate 5, not the section 1.

The LCD device of FIG. 5 comprises a liquid crystal section 1 having a first substrate (a TFT substrate), a second substrate (a counter or opposite substrate), and a liquid crystal layer. The first and second substrates are fixed in parallel to each other while the liquid crystal layer is interposed between these two substrates. Switching elements such as TFTs are formed on the first substrate.

The LCD device of FIG. 5 further comprises a microlens array 2b, quarter wavelength ($\lambda/4$) plates 3a and 3b, polarizer plates 4a and 4b, a light guide plate 5, a light source 6, and a viewing-angle controller plate 8. The microlens array 2b, the quarter wavelength plate 3a, the polarizer plate 4a, the guide plate 5, and the light source 6 are located on the input side of the LCD device. The quarter wavelength plate 3b, the polarizer plate 4b, and the viewing angle controller plate 8 are located on the output side thereof.

Unlike the array 2a in the first embodiment, the microlens array 2b is united with the output side of the guide plate 5. The light source 6 generates and emits backlight $L_{IN}$ toward the guide plate 5. The backlight $L_{IN}$ is introduced into the array 2b by way of the windows 2bb of the array 2b from the plate 5. The array 2b collimates the light $L_{IN}$. The polarizer plate 4a and the quarter wavelength plate 3a operate in combination to convert the collimated backlight $L_{IN}$ to circularly polarized light and introduce the light thus converted into the section 1. The polarizer plate 4b and the quarter wavelength plate 3b operate in combination to pass selectively the light that has passed through the section 1 to the output side. The viewing angle controller plate 8 diffuses the light that has passed through the plate 4b to improve the viewing angle characteristics, resulting in the output light $L_{OUT}$.

Although the detailed structure of the liquid crystal section 1 is not illustrated in FIG. 5, any structure may be used if it generates electric fields approximately perpendicular to the first and second substrates by applying a voltage across the electrodes on the first substrate and those on the second substrate, thereby changing the orientation of the liquid crystal molecules to be normal with respect to the first and second substrates. The color filter for displaying color images may be located on the second substrate (i.e., the ordinary structure) and on the first substrate (i.e., the CF-on-TFT structure).

The microlens array 2b, which is united with the guide plate 5, has microlenses 2ba arranged at the corresponding positions to the pixels. The shape and focal points of the lenses 2ba are determined in such a way that the light that has entered through the windows 2bb propagates through the cell 1 in the form of collimated light. The lenses 2ba serve as point sources of light. Therefore, instead of the lenses 2ba, light-emitting diodes may be formed in the form of matrix array.

Since the array 2b is formed to be integrated with the plate 5, not the first substrate, there is a disadvantage that positional alignment of the necessary elements needs to be well controlled. However, there is an additional advantage that the limitation for the material and the fabrication method of the first substrate is relaxed. Specifically, if the array 2a is united with the first substrate, as explained in the first embodiment, a proper material for the first substrate needs to be chosen while taking the material for the array 2b into consideration. When the array 2a is formed on the back of the first substrate, there is a possibility that the surface of the first substrate is contaminated. Unlike this, the liquid crystal cell 1 can be formed in an ordinary, known method in the second embodiment.

When no voltage is applied across the liquid crystal layer 22 with the vertical orientation mode, as shown in FIG. 3A, the backlight $L_{IN}$ is collimated by the microlens array 2a and then, converted to the linearly polarized light $L_{LIN}$ by the polarizer plate 4a. By the quarter wavelength plate 3a, the linearly polarized light $L_{LIN}$ is converted to the right-handed circularly polarized light $L_{CIRR}$. The light $L_{CIRR}$ is introduced into the liquid crystal layer 22. In this state, the long axis of each elongated molecule 9 of the liquid crystal is oriented perpendicular to the substrate 28 and therefore, no phase shift occurs in the light $L_{CIRR}$. Then, the light $L_{CIRR}$ enters the quarter wavelength plate 3b on the output side, in which the light $L_{CIRR}$ is converted to linearly polarized light. However, the polarization direction of the polarizer plate 4b on the output side is set to be perpendicular to that of the plate 4a on the input side. Thus, the light does not penetrate the plate 4b. This means that the pixel in question is dark.

On the other hand, in the state of FIG. 3B, where a voltage is applied across the liquid crystal layer 22. The molecules 9 are inclined toward the parallel direction to the substrate 28 due to the applied voltage and the elastic force of the molecules 9 themselves. The inclination angle of the molecules 9 increases as the position approaches the center of the liquid crystal layer 22. If the right-handed circularly polarized light $L_{CIRR}$ is introduced into the layer 1, a phase difference occurs in the light $L_{CIRR}$ due to the birefringence property of the molecules 9, thereby changing the polarization state of the light $L_{CIRR}$. Since the thickness of the layer 22 is adjusted in such a away that the phase difference is equal to π, the light $L_{CIRR}$ is converted to left-handed circularly polarized light $L_{CIRL}$. The light $L_{CIRL}$ passes through the quarter wavelength plate 3b and the polarizer plate 4b. This means that the pixel in question is bright.

Accordingly, with the inventive structure of the second embodiment, circularly polarized light enters the section 1 and therefore, an equal phase difference occurs in the section 1 independent of the inclination direction of the molecules 9. Thus, the quantity of the transmitted light is kept unchanged under application of voltage, which is a remarkable advantage. This means that the orientation layer is unnecessary and the rubbing process can be omitted.

Since the incident light $L_{IN}$ is collimated by the microlens array 2b and then, converted to circularly polarized light by the combination of the polarizer plate 4a and the quarter wavelength plate 3a. Thereafter, the circularly polarized light enters the liquid crystal section 1. Accordingly, similar to the first embodiment, precise alignment of the axes of the plates 4a and 4b is unnecessary and at the same time, redundancy for the fabrication processes is available. Moreover, if a liquid crystal having a large refractive index anisotropy Δn is employed, high-speed response is obtainable as desired.

In the second embodiment, the microlens array 2b is located closer to the guide plate 5 while the polarizer plate 4a and the quarter wavelength plate 3a are located closer to the section 1. However, the microlens array 2b may be located closer to the section 1 while the polarizer plate 4a and the quarter wavelength plate 3a may be located closer to the guide plate 5.

Third Embodiment

The third embodiment of the invention relates to a method of fabricating a LCD device. FIGS. 6A to 6C show the process steps of the method and FIG. 7 shows the configuration of a laser apparatus used therefor.

In the following explanation, the TFT substrate 10 on which TFTs are formed is fabricated in a known, ordinary method and therefore, only the process steps of forming the microlens array are explained.

First, as shown in FIG. 6A, a polycarbonate sheet or plate 11 with a thickness of approximately 50 μm is attached on the back of the TFT substrate 10 with or without an adhesive.

Next, as shown in FIG. 6B, for example, KrF excimer laser light 13 with a wavelength of 248 nm is irradiated to the sheet 11 in the form of pulse. The irradiation is carried out at approximately 500 pulses while the light 13 is aligned with respect to the substrate 10 using the metal wiring lines, semiconductor layers, and/or alignment marks on the substrate 10.

The energy intensity profile of the laser light 13 is curved circularly, as shown in FIG. 6B. The intensity is approximately 1200 mJ/cm² in the periphery of the profile (i.e., between the adjoining pixels) and approximately 250 mJ/cm² at the bottom thereof (i.e., the center of the pixel. Due to the irradiation of the light 13, the polycarbonate sheet 11 is decomposed and evaporated, resulting in convex microlenses 15a for the respective pixels on the substrate 10, as shown in FIG. 6C. The cross section of the microlens 15a is a mirror image of the profile of the light 13. The positional accuracy of the microlenses 15a is sufficiently high.

Figure 8:
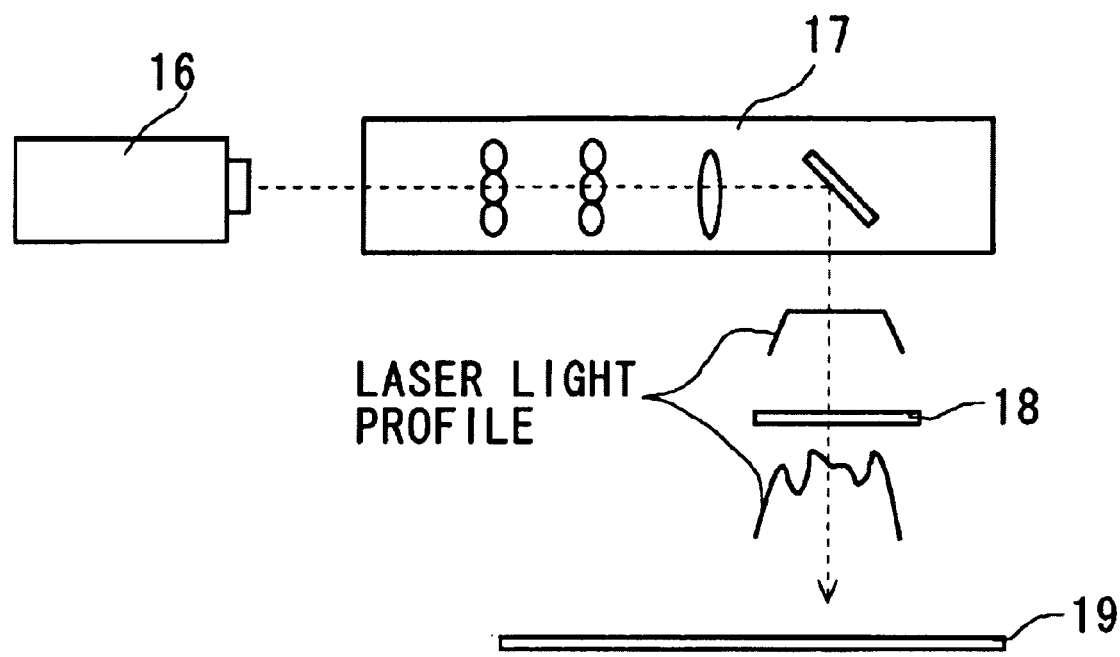
FIG. 8 is a schematic view showing the structure of a laser irradiation apparatus used for the methods of the third and fourth embodiments of FIGS. 7A to 7C and FIGS. 8A to 8C.

The beam profile of FIG. 6B is realized by the laser apparatus shown in FIG. 8. A laser source 16 generates and emits pulsed laser light. The light is sent to an optical system 17 including a fry-eye lens and a returning mirror, thereby shaping the light to have a flat top profile with a fixed energy region. Thereafter, the flat-top laser light is irradiated to the substrate 19 by way of a dielectric mask 18. The beam shape of the light is adjusted by the mask 18 as desired.

The mask is formed by depositing a proper dielectric layer on a quartz substrate. If the material and thickness of the deposited dielectric layer are changed, the transmittance is adjustable as desired. If the dielectric layer is patterned to be islands, a desired transmittance can be obtained with a desired shape.

With the method of fabricating a LCD device according to the third embodiment, the microlenses 15a are formed on the substrate 10 to be united together. Therefore, the positional accuracy between the microlenses 15a and the substrate 10 is ensured. Thus, the LCD device can be assembled easily and reliably.

Fourth Embodiment

Figure 7A:
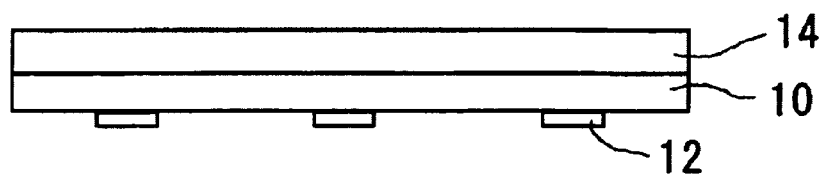
FIGS. 7A to 7C are schematic, partial cross-sectional views showing another method of fabricating a LCD device according to the fourth embodiment of the invention, respectively, in which an array of concave microlens are formed on the substrate.
Figure 7B:
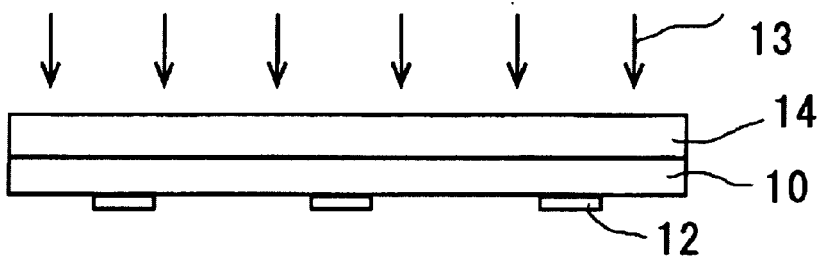
Figure 7C:
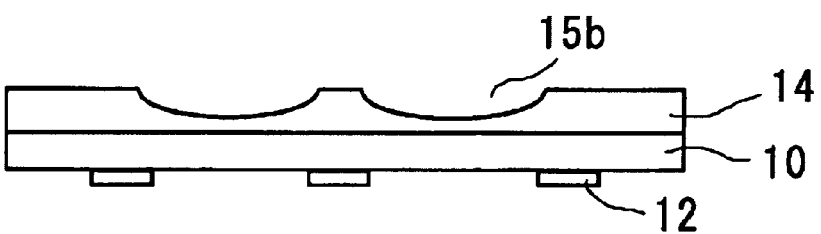

The fourth embodiment of the invention relates to a method of fabricating a LCD device. FIGS. 7A to 7C show the process steps of the method.

First, as shown in FIG. 7A, an acrylic resin sheet or plate 14 is attached on the back of the TFT substrate 10 with or without an adhesive.

Next, as shown in FIG. 7B, for example, XeCl excimer laser light 13 with a wavelength of 308 nm is irradiated to the sheet 14 in the form of pulse. The light 13 is spot-shaped. The irradiation of the light 13 is carried out at approximately 400 pulses while the light 13 is aligned with respect to the substrate 10 using the metal wiring lines, semiconductor layers, and/or alignment marks on the substrate 10.

The energy intensity profile of the laser light 13 is curved like the Gauss distribution, as shown in FIG. 7B. The diameter of the light 13 is approximately equal to the opening of the pixel. The intensity is approximately 800 mJ/cm$^2$ at the bottom of the beam (i.e., the center of the pixel). Due to the irradiation of the light 13, the acrylic resin sheet 14 is decomposed and evaporated, resulting in concave microlenses 15b for the respective pixels on the substrate 10, as shown in FIG. 7C. The positional accuracy of the microlenses 15b is sufficiently high.

In the third and fourth embodiments, the microlens array is formed by the polycarbonate or acrylic sheet 11 or 14. However, any other material such as plastics deformable by irradiation of laser light may be used for this purpose. The TFT substrate 10 itself may be formed by a plastic material, such as polyether sulfone (PES). In this case, the microlens array may be formed by irradiating directly laser light to the back of the substrate.

Variations

Needless to say, the present invention is not limited to the above-described embodiments. Any change or modification may be added to them within the spirit of the invention.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A liquid crystal display device comprising:
   (a) a first substrate located on an input side;
   (b) a second substrate fixed to be opposite to the first substrate;
   the second substrate being located on an output side;
   (c) a liquid crystal layer interposed between the first substrate and the second substrate;
   the liquid crystal layer containing a liquid crystal;
   the liquid crystal layer and the first and second substrates constituting a liquid crystal section;
   (d) a collimator for collimating its incident light;
   the collimator being located on the input side;
   (e) a first polarization controller for controlling polarization state of its incident light;
   the first polarization controller being located on the input side;
   the first polarization controller including a first polarizer member and a first quarter wavelength member;
   (g) a second polarization controller for controlling polarization state of its incident light;
   the second polarization controller being located on the output side;
   the second polarization controller including a second polarizer member and a second quarter wavelength member;
   wherein said collimator is located between said first nolarization controller and second polarization controller.

2. The device according to claim 1, further comprising a half wavelength plate located between the first or second polarizer member and the first or second substrate.

3. The device according to claim 1, wherein the collimator is a microlens array having microlenses arranged in a matrix array corresponding to respective pixels.

4. The device according to claim 3, wherein the microlens array is made of a material deformable by irradiation of laser light;
   and wherein the array is united with a back of the first substrate.

5. The device according to claim 1, wherein the liquid crystal of the liquid crystal layer has negative anisotropy of dielectric constant;
   and wherein molecules of the liquid crystal are orientated approximately perpendicular to the first substrate when no voltage is applied across the liquid crystal layer.

6. The device according to claim 5, wherein the liquid crystal has an optical anisotropy Δn and the liquid crystal layer has a thickness d;
   and wherein product (Δn·d) of the anisotropy Δn and the thickness d is in a range of 400 nm to 800 nm.

7. The device according to claim 1, wherein the liquid crystal of the liquid crystal layer has positive anisotropy of dielectric constant;
   and wherein molecules of the liquid crystal are aligned to have a homogeneous structure when no voltage is applied across the liquid crystal layer.

8. The device according to claim 1, wherein the first substrate has scan signal electrodes, data electrodes, and pixel electrodes;
   and wherein the second substrate has a counter electrode opposite to the pixel electrodes.

9. The device according to claim 8, wherein each of the electrodes on the first substrate has a symmetrical shape;
   and wherein the counter electrode on the second substrate covers entirely the electrodes on the first substrate, and is wider than the electrodes on the first substrate.

10. The device according to claim 8, wherein each of the electrodes on the first substrate has a series of symmetrical shapes.

11. The device according to claim 9, wherein each of the electrodes on the first substrate has a depression at a position corresponding to a symmetrical axis.

12. The device according to claim 9, wherein each of the electrodes on the first substrate has a columnar spacer at a position corresponding to a symmetrical center.

13. The device according to claim 9, wherein the electrode on the second substrate has a structure including protrusions formed entirely or partially at positions overlapped with symmetrical axes of the electrodes on the first substrate when observed along a normal of the first substrate.

14. The device according to claim 9, wherein the electrode on the second substrate has a structure including openings formed entirely or partially at positions overlapped with symmetrical axes of the electrodes on the first substrate when observed along a normal of the first substrate.

15. The device according to claim 1, wherein the device operates in a vertical alignment mode.

16. A liquid crystal display device comprising:
   (a) a first substrate located on an input side;
   (b) a second substrate fixed to be opposite to the first substrate;
      the second substrate being located on an output side;
   (c) a liquid crystal layer interposed between the first substrate and the second substrate;
      the liquid crystal layer containing a liquid crystal;
      the liquid crystal layer and the first and second substrates constituting a liquid crystal section;
   (d) a collimator for collimating its incident light;
      the collimator being located on the input side;
   (e) a first polarization controller for controlling polarization state of its incident light;
      the first polarization controller being located on the input side;
      the first polarization controller including a first polarizer plate and a first quarter wavelength plate;
   (g) a second polarization controller for controlling polarization state of its incident light;
      the second polarization controller being located on the output side;
      the second polarization controller including a second polarizer plate and a second quarter wavelength plate; and
   (h) a viewing-angle controller member located on the output side
      wherein said collimator is located between said first polarization controller and said second polarization controller.

17. The device according to claim 16, wherein the viewing-angle controller member includes a polymer-dispersed liquid crystal layer;
   and wherein a transmittance of the polymer-dispersed liquid crystal layer is changed by a voltage applied across the polymer-dispersed liquid crystal layer, thereby adjusting viewing angle.

18. The device according to claim 16, further comprising a half wavelength plate located between the first polarizer plate and the first substrate.

19. The device according to claim 16, wherein the collimator is a microlens array having microlenses arranged in a matrix array corresponding to respective pixels.

20. The device according to claim 19, wherein the microlens array is made of a material deformable by irradiation of laser light;
   and wherein the array is united with a back of the first substrate.

21. The device according to claim 16, wherein the liquid crystal of the liquid crystal layer has negative anisotropy of dielectric constant;
   and wherein molecules of the liquid crystal are orientated approximately perpendicular to the first substrate when no voltage is applied across the liquid crystal layer.

22. The device according to claim 21, wherein the liquid crystal has an optical anisotropy $\Delta n$ and the liquid crystal layer has a thickness d;
   and wherein product ($\Delta n \cdot d$) of the anisotropy $\Delta n$ and the thickness d is in a range of 400 nm to 800 nm.

23. The device according to claim 16, wherein the liquid crystal of the liquid crystal layer has positive anisotropy of dielectric constant;
   and wherein molecules of the liquid crystal are aligned to have a homogeneous structure when no voltage is applied across the liquid crystal layer.

24. The device according to claim 16, wherein the first substrate has scan signal electrodes, image signal electrodes, and pixel electrodes;
   and wherein the second substrate has a counter electrode opposite to the pixel electrodes.

25. The device according to claim 24, wherein each of the electrodes on the first substrate has a symmetrical shape;
   and wherein the counter electrode on the second substrate covers entirely the electrodes on the first substrate, and is wider than the electrodes on the first substrate.

26. The device according to claim 24, wherein each of the electrodes on the first substrate has a series of symmetrical shapes.

27. The device according to claim 25, wherein each of the electrodes on the first substrate has a depression at a position corresponding to a symmetrical axis.

28. The device according to claim 25, wherein each of the electrodes on the first substrate has a columnar spacer at a position corresponding to a symmetrical center.

29. The device according to claim 25, wherein the electrode on the second substrate has a structure including protrusions formed entirely or partially at positions overlapped with symmetrical axes of the electrodes on the first substrate when observed along a normal of the first substrate.

30. The device according to claim 25, wherein the electrode on the second substrate has a structure including openings formed entirely or partially at positions overlapped with symmetrical axes of the electrodes on the first substrate when observed along a normal of the first substrate.

31. The device according to claim 16, wherein the device operates in a vertical alignment mode.

32. A liquid crystal display device comprising:
   (a) a first substrate located on an input side;
   (b) a second substrate fixed to be opposite to the first substrate;
      the second substrate being located on an output side;
   (c) a liquid crystal layer interposed between the first substrate and the second substrate;
      the liquid crystal layer containing a liquid crystal;
      the liquid crystal layer and the first and second substrates constituting a liquid crystal
   (d) a collimator for collimating its incident light;
      the collimator being located on the input side;
   (e) a first polarization controller for controlling polarization state of its incident light;
      the first polarization controller being located on the input side;

the first polarization controller including a first polarizer elate and a first quarter wavelength plate;

(g) a second polarization controller for controlling polarization state of its incident light;
the second polarization controller being located on the output side;
the second polarization controller including a second polarizer plate and a second quarter wavelength plate; and (h) a viewing-angle controller member located on the output side wherein the viewing-angle controller member is detachable;
and wherein viewing angle is adjustable by replacing the viewing-angle controller member with another one.

* * * * *

UNITED STATES PATENT AND TRADEMARK OFFICE
CERTIFICATE OF CORRECTION

PATENT NO. : 6,924,856 B2  Page 1 of 1
APPLICATION NO. : 10/172261
DATED : August 2, 2005
INVENTOR(S) : Okumura et al.

It is certified that error appears in the above-identified patent and that said Letters Patent is hereby corrected as shown below:

Claim 16, Col. 25, line 46, "output side" should be --output side,--.

Claim 32, Col. 26, line 61, "a liquid crystal" should be --a liquid crystal section;--.

Claim 32, Col. 27, line 2, "polarizer elate and" should be --polarizer plate and--.

Signed and Sealed this

Seventeenth Day of August, 2010

David J. Kappos
*Director of the United States Patent and Trademark Office*